United States Patent
Ichihashi et al.

(10) Patent No.: US 8,824,782 B2
(45) Date of Patent: Sep. 2, 2014

(54) ADDITION RATIO LEARNING APPARATUS AND METHOD, IMAGE PROCESSING APPARATUS AND METHOD, PROGRAM, AND RECORDING MEDIUM

(75) Inventors: Hideyuki Ichihashi, Tokyo (JP); Takahiro Nagano, Kanagawa (JP); Nobuhiro Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 225 days.

(21) Appl. No.: 13/456,736

(22) Filed: Apr. 26, 2012

(65) Prior Publication Data
US 2012/0288187 A1     Nov. 15, 2012

(30) Foreign Application Priority Data
May 12, 2011     (JP) .................................. 2011-107306

(51) Int. Cl.
*G06K 9/62*     (2006.01)
(52) U.S. Cl.
USPC .. 382/159; 382/275; 375/240.27; 375/240.29
(58) Field of Classification Search
CPC ............................................ G06T 2207/20182
USPC ................ 382/159, 275; 375/240.27, 240.29
See application file for complete search history.

(56) References Cited

U.S. PATENT DOCUMENTS

| | | | |
|---|---|---|---|
| 7,295,616 B2 * | 11/2007 | Sun et al. ................. | 375/240.27 |
| 2009/0027401 A1 * | 1/2009 | Loveridge et al. ............ | 345/501 |

FOREIGN PATENT DOCUMENTS

| | | |
|---|---|---|
| JP | 2007-329524 | 12/2007 |
| JP | 2010-171753 | 8/2010 |

* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

There is provided an addition ratio learning apparatus including a noise adding unit that adds noises to data of an image input as a teacher image, a motion compensating unit that sets an image where time addition noise reduction processing is executed as an NR screen and performs motion compensation with respect to the NR screen, a differential feature amount calculating unit that sets an image as an input screen and calculates a differential feature amount, a circulation history specifying unit that counts a circulation history in the time addition noise reduction processing and specifies the circulation history, an addition ratio computing unit that computes an addition ratio on the basis of pixel values, and a time adding unit that performs multiplication by a coefficient determined according to the computed addition ratio to perform weighted addition and executes the time addition noise reduction processing with respect to the input screen.

7 Claims, 18 Drawing Sheets

ADDITION RATIO LEARNING APPARATUS AND METHOD, IMAGE PROCESSING APPARATUS AND METHOD, PROGRAM, AND RECORDING MEDIUM

BACKGROUND

The present technology relates to an addition ratio learning apparatus and method, an image processing apparatus and method, a program, and a recording medium and particularly, to an addition ratio learning apparatus and method, an image processing apparatus and method, a program, and a recording medium that enable a high noise reduction effect to be obtained with respect to all images.

In a video signal of a motion picture, similar image information is repeated with a frame period and a correlation between frames is very strong. Meanwhile, because the video signal does not correlate with encoding distortion or noise components, if the video signal is time-averaged in units of frames, signal components is almost unchanged and only the distortion or noise components decrease. Therefore, the distortion or noise can be reduced.

As an apparatus that reduces the noise using a characteristic of the video signal, a frame circulation noise reducing apparatus that reduces the noise while detecting a motion of an image one frame before and compensating for the motion is known.

The noise reducing apparatus in the related art is configured to change an addition ratio according to motion components of an image or an amount of noise included in the image, weight-average a pixel of a current frame and a corresponding pixel of a previous frame on the basis of the addition ratio, and generate an output video signal. Therefore, the motion compensated corresponding pixel is cumulatively weight-averaged and the noise can be reduced while a residual image is prevented from being generated.

In addition, technology for adding a plurality of images while performing motion compensation, executing noise reduction processing of a temporal direction, and executing the noise reduction processing of a spatial direction in one image with respect to each image before the addition has been suggested (for example, refer to Japanese Laid-Open Patent Publication No. 2010-171753).

According to the technology that is disclosed in Japanese Laid-Open Patent Publication No. 2010-171753, the strength of the noise reduction of the spatial direction can be changed with respect to the plurality of images to be added, and the noise can be reduced and the signal components can be preserved when in-plane NR processing and addition NR processing are executed.

In addition, technology for counting a field number and a frame number after a signal level rapidly changes in an input video signal and dynamically controlling an addition ratio such that the addition ratio gradually increases according to a count value has been suggested (for example, refer to Japanese Laid-Open Patent Publication No. 2007-329524).

SUMMARY

However, in the related art, only a single parameter (for example, noise amount) is considered when the addition ratio is controlled.

Therefore, in the related art, it is difficult to obtain a high noise reduction effect with respect to all images.

The present disclosure has been made in view of the above circumstances and enables a high noise reduction effect to be obtained with respect to all images.

According to an embodiment of the present technology, there is provided an addition ratio learning apparatus which includes a noise adding unit that adds noises to data of an image input as a teacher image, a motion compensating unit that sets an image where time addition noise reduction processing is executed with respect to an image of an (n−1)-th frame to which the noises have been added as an NR screen and performs motion compensation with respect to the NR screen, a differential feature amount calculating unit that sets an image of an n-th frame to which the noises have been added as an input screen and calculates a differential feature amount on the basis of a pixel value of a predetermined area forming the input screen and a pixel value of a corresponding area in the motion compensated NR screen, a circulation history specifying unit that counts a circulation history in the time addition noise reduction processing and specifies the circulation history in the time addition noise reduction processing, an addition ratio computing unit that computes an addition ratio corresponding to the noises, the differential feature amount, and the circulation history on the basis of a pixel value of the teacher image, a corresponding pixel value in the input screen, and a corresponding pixel value in the motion compensated NR screen, and a time adding unit that performs multiplication by a coefficient determined according to the computed addition ratio to perform weighted addition on the pixel value of the input screen and the corresponding pixel value in the motion compensated NR screen and thereby executes the time addition noise reduction processing with respect to the input screen.

A class code determining unit that sets the noises, the differential feature amount, and the circulation history as learning parameters and determines a class code obtained as a combination of the learning parameters can be further included. The addition ratio computing unit can compute an addition ratio corresponding to the class code.

A class code determining unit that sets the noises, the differential feature amount, and the circulation history as learning parameters and determines a class code obtained as a combination of the learning parameters, and a storage unit that stores the addition ratio computed by the addition ratio computing unit as a learning result by the addition ratio learning apparatus, for each class code can be further included.

A class code determining unit that sets the noises, the differential feature amount, and the circulation history as learning parameters and determines a class code obtained as a combination of the learning parameters, and a sample sorting unit that sorts samples of a linear expression generated using the pixel value of the teacher image, the corresponding pixel value in the input screen, and the corresponding pixel value in the motion compensated NR screen for each class code and accumulates the samples can be further included. The addition ratio computing unit can add the samples, calculates a coefficient of the linear expression by a least-square method, and thereby compute the addition ratio.

A plurality of addition ratio computing units can be included. The plurality of addition ratio computing units can share the addition ratio and compute the addition ratio on the basis of a value of each learning parameter.

According to the embodiment of the present technology, there is provided an addition ratio learning method which includes causing a noise adding unit to add noises to data of an image input as a teacher image, causing a motion compensating unit to set an image where time addition noise reduction processing is executed with respect to an image of an (n−1)-th frame to which the noises have been added as an NR screen and perform motion compensation with respect to the NR screen, causing a differential feature amount calculating unit to set an image of an n-th frame to which the noises have been added as an input screen and calculate a differential feature amount on the basis of a pixel value of a predetermined area forming the input screen and a pixel value of a corresponding area in the motion compensated NR screen, causing a circulation history specifying unit to count a circulation history in the time addition noise reduction processing and specify the circulation history in the time addition noise reduction processing, causing an addition ratio computing unit to compute an addition ratio corresponding to the noises, the differential feature amount, and the circulation history on the basis of a pixel value of the teacher image, a corresponding pixel value in the input screen, and a corresponding pixel value in the motion compensated NR screen, and causing a time adding unit to perform multiplication by a coefficient determined according to the computed addition ratio to perform weighted addition on the pixel value of the input screen and the corresponding pixel value in the motion compensated NR screen and thereby execute the time addition noise reduction processing with respect to the input screen.

According to the embodiment of the present technology, there is provided a program for causing a computer to function as an addition ratio learning apparatus. The addition ratio learning apparatus includes a noise adding unit that adds noises to data of an image input as a teacher image, a motion compensating unit that sets an image where time addition noise reduction processing is executed with respect to an image of an (n-1)-th frame to which the noises have been added as an NR screen and performs motion compensation with respect to the NR screen, a differential feature amount calculating unit that sets an image of an n-th frame to which the noises have been added as an input screen and calculates a differential feature amount on the basis of a pixel value of a predetermined area forming the input screen and a pixel value of a corresponding area in the motion compensated NR screen, a circulation history specifying unit that counts a circulation history in the time addition noise reduction processing and specifies the circulation history in the time addition noise reduction processing, an addition ratio computing unit that computes an addition ratio corresponding to the noises, the differential feature amount, and the circulation history on the basis of a pixel value of the teacher image, a corresponding pixel value in the input screen, and a corresponding pixel value in the motion compensated NR screen, and a time adding unit that performs multiplication by a coefficient determined according to the computed addition ratio to perform weighted addition on the pixel value of the input screen and the corresponding pixel value in the motion compensated NR screen and thereby executes the time addition noise reduction processing with respect to the input screen.

According to the embodiment of the present technology, the noises are added to the data of the image input as the teacher image. The image where the time addition noise reduction processing is executed with respect to the image of the (n-1)-th frame to which the noises have been added is set as the NR screen and the motion compensation is performed with respect to the NR screen. The image of the n-th frame to which the noises have been added is set as the input screen and the differential feature amount is calculated on the basis of the pixel value of the predetermined area forming the input screen and the pixel value of the corresponding area in the motion compensated NR screen. The circulation history in the time addition noise reduction processing is counted and the circulation history in the time addition noise reduction processing is specified. The addition ratio corresponding to the noises, the differential feature amount, and the circulation history are computed on the basis of the pixel value of the teacher image, the corresponding pixel value in the input screen, and the corresponding pixel value in the motion compensated NR screen. Multiplication by the coefficient determined according to the computed addition ratio is performed to perform the weighted addition on the pixel value of the input screen and the corresponding pixel value in the motion compensated NR screen and the time addition noise reduction processing is executed with respect to the input screen.

According to another embodiment of the present technology, there is provided an image processing apparatus which includes a motion compensating unit that sets an image where time addition noise reduction processing is executed with respect to an image of an (n-1)-th frame as an NR screen and performs motion compensation with respect to the NR screen, a noise measuring unit that sets an image of an n-th frame in data of an input image as an input screen and measures noises of the input screen, a differential feature amount calculating unit that calculates a differential feature amount on the basis of a pixel value of a predetermined area forming the input screen and a pixel value of a corresponding area in the motion compensated NR screen, a circulation history specifying unit that counts a circulation history in the time addition noise reduction processing and specifies the circulation history in the time addition noise reduction processing, an addition ratio determining unit that determines an addition ratio corresponding to the noises, the differential feature amount, and the circulation history, and a time adding unit that performs multiplication by a coefficient determined according to the determined addition ratio to perform weighted addition on the pixel value of the input screen and the corresponding pixel value in the motion compensated NR screen and thereby executes the time addition noise reduction processing with respect to the input screen.

A class code determining unit that determines a class code obtained as a combination of the noises, the differential feature amount, and the circulation history can be further included. The addition ratio determining unit can determine an addition ratio corresponding to the class code.

The circulation history specifying unit can reset a count of the circulation history when the differential feature amount more than a preset threshold value is calculated.

The circulation history specifying unit can reset a count of the circulation history when the differential feature amount more than a threshold value determined in advance according to an amount of the noises is calculated.

According to the embodiment of the present technology, there is provided an image processing method which includes causing a motion compensating unit to set an image where time addition noise reduction processing is executed with respect to an image of an (n-1)-th frame as an NR screen and perform motion compensation with respect to the NR screen, causing a noise measuring unit to set an image of an n-th frame in data of an input image as an input screen and measure noises of the input screen, causing a differential feature amount calculating unit to calculate a differential feature amount on the basis of a pixel value of a predetermined area forming the input screen and a pixel value of a corresponding area in the motion compensated NR screen, causing a circulation history specifying unit to count a circulation history in the time addition noise reduction processing and specify the circulation history in the time addition noise reduction processing, causing an addition ratio determining unit to determine an addition ratio corresponding to the noises, the differential feature amount, and the circulation history, and causing a time adding unit to perform multiplication by a coefficient determined according to the determined addition ratio to perform weighted addition on the pixel value of the input screen and the corresponding pixel value in the motion compensated NR screen and thereby execute the time addition noise reduction processing with respect to the input screen.

According to the embodiment of the present technology, there is provided a program for causing a computer to function as an image processing apparatus. The image processing apparatus includes a motion compensating unit that sets an image where time addition noise reduction processing is executed with respect to an image of an (n−1)-th frame as an NR screen and performs motion compensation with respect to the NR screen, a noise measuring unit that sets an image of an n-th frame in data of an input image as an input screen and measures noises of the input screen, a differential feature amount calculating unit that calculates a differential feature amount on the basis of a pixel value of a predetermined area forming the input screen and a pixel value of a corresponding area in the motion compensated NR screen, a circulation history specifying unit that counts a circulation history in the time addition noise reduction processing and specifies the circulation history in the time addition noise reduction processing, an addition ratio determining unit that determines an addition ratio corresponding to the noises, the differential feature amount, and the circulation history, and a time adding unit that performs multiplication by a coefficient determined according to the determined addition ratio to perform weighted addition on the pixel value of the input screen and the corresponding pixel value in the motion compensated NR screen and thereby executes the time addition noise reduction processing with respect to the input screen.

In a second aspect of the present technology, the image where the time addition noise reduction processing is executed with respect to the image of the (n−1)-th frame is set as the NR screen and the motion compensation is performed with respect to the NR screen. The image of the n-th frame in the data of the input image is set as the input screen and the noises of the input screen are measured. The differential feature amount is calculated on the basis of the pixel value of the predetermined area forming the input screen and the pixel value of the corresponding area in the motion compensated NR screen. The circulation history in the time addition noise reduction processing is counted and the circulation history in the time addition noise reduction processing is specified. The addition ratio corresponding to the noises, the differential feature amount, and the circulation history are determined. Multiplication by the coefficient determined according to the determined addition ratio is performed to perform the weighted addition on the pixel value of the input screen and the corresponding pixel value in the motion compensated NR screen and the time addition noise reduction processing is executed with respect to the input screen.

According to the present technology described above, a high noise reduction effect can be obtained with respect to all images.

DETAILED DESCRIPTION OF THE EMBODIMENT(S)

Figure 1:
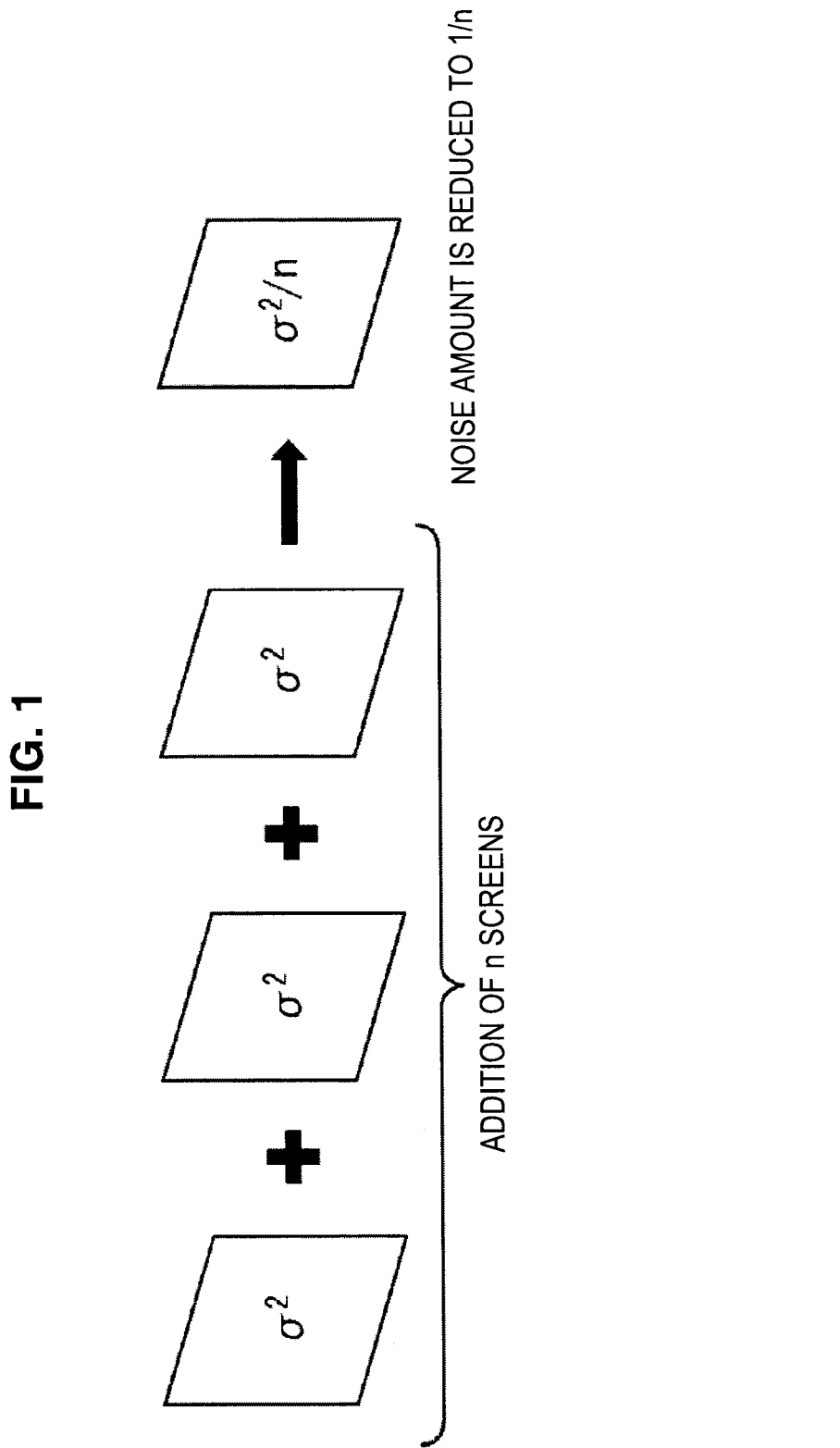
FIG. 1 is a diagram illustrating time addition noise reduction processing.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Hereinafter, an embodiment of the present technology disclosed herein will be described below with reference to the drawings.

First, time addition noise reduction (time addition NR) processing will be described. The time addition noise reduction processing is also called frame circulation noise reduction processing.

For example, in a video signal (image signal) of a motion picture, similar image information is repeated with a frame period and a correlation between frames is very strong. Meanwhile, because the video signal does not correlate with encoding distortion or noise components, if the video signal is time-averaged in units of frames, signal components rarely change and only the distortion or noise components decrease. Therefore, the distortion or noise can be reduced. A system for reducing noise using a characteristic of the image signal is the frame circulation noise reduction processing. A noise reducing apparatus that executes the frame circulation noise reduction processing is also called an infinite impulse response (IIR) filter.

The case in which the standard deviation of noises in a frame 1, a frame 2, . . . , and a frame n is σ is considered.

If all intra-screen pixels in each of the frame 1, the frame 2, . . . , and the frame n are represented by X1, X2, . . . , and Xn and a function for calculating the variance of the pixels is represented by V, an intra-screen noise amount of each frame is represented by Expression 1.

$$V(X_1)=V(X_2)=\ldots=V(X_n)=\sigma^2 \quad (1)$$

In the expression 1, the square of a shows an intra-screen noise amount of each frame.

In addition, a mean value of intra-screen pixel values in each of the frame 1, the frame 2, . . . , and the frame n are represented Expression 2.

$$\overline{X}=(X_1+X_2+\ldots+X_n)/n \quad (2)$$

Then, Expression 3 is derived from a law of logarithms.

$$V(\overline{X})=\sigma^2/n \quad (3)$$

From Expression 3, it can be seen that the noise can be reduced by adding the pixel values of the frame 1, the frame 2, . . . , and the frame n.

That is, as illustrated in FIG. 1, if n screens forming a motion picture are added in a temporal direction, screens where the noise amount is reduced to 1/n can be generated. In the time addition noise reduction processing, the noise of the image is reduced (noise reduction: NR) in the above-described way.

Figure 2:
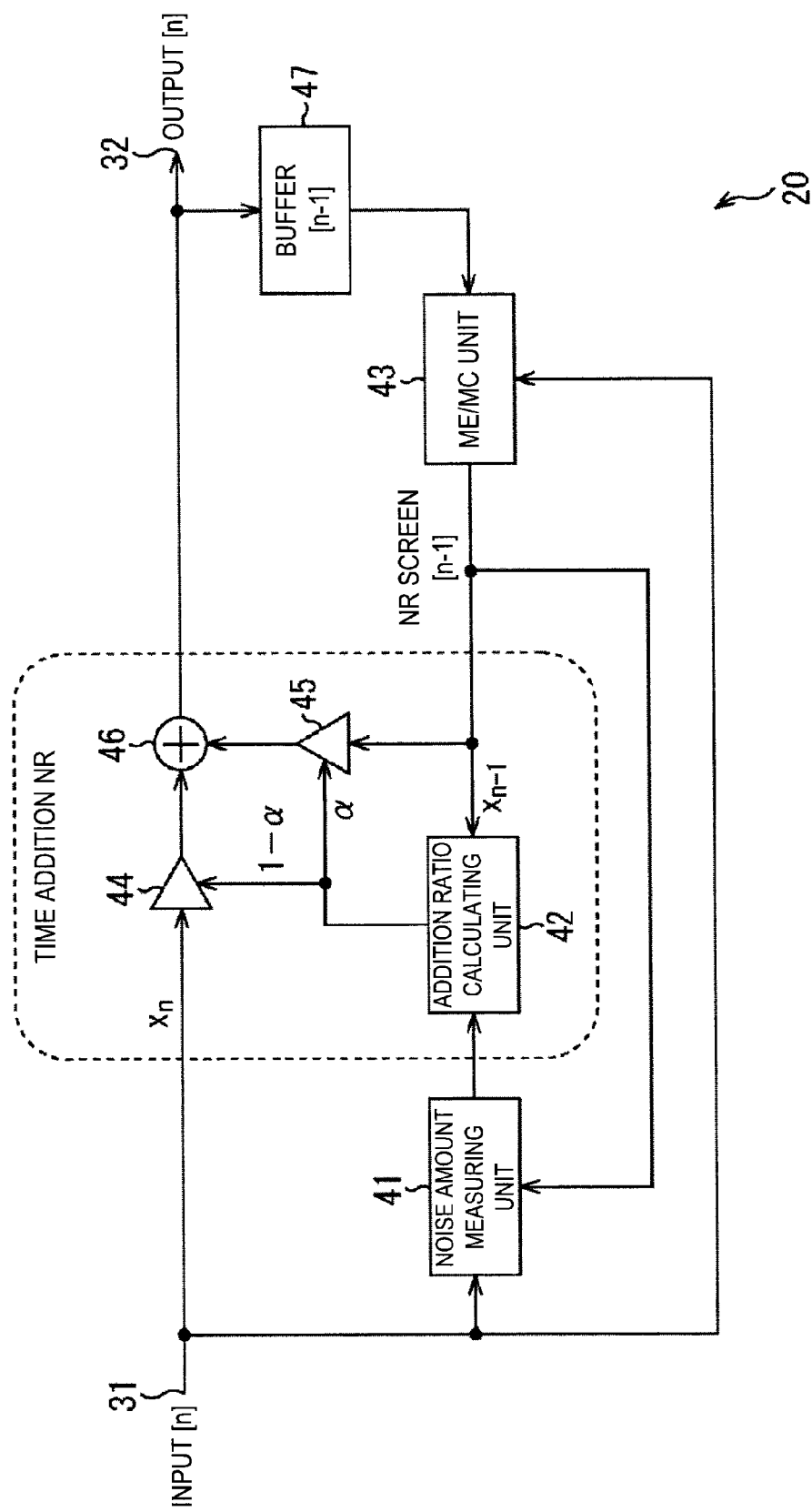
FIG. 2 is a block diagram illustrating a configuration example of an IIR filter in the related art.

FIG. 2 is a block diagram illustrating a configuration example of an IIR filter in the related art. An IIR filter 20 illustrated in FIG. 2 reduces noise of a motion picture input from an input terminal 31 and outputs the motion picture from an output terminal 32.

The IIR filter 20 of FIG. 2 includes a noise measuring unit 41, an addition ratio calculating unit 42, a motion estimation (ME)/motion compensation (MC) unit 43, a multiplier 44, a multiplier 45, an adder 46, and a buffer 47.

An n-th frame input from the input terminal 31 (hereinafter referred to as an input screen) is input to the noise measuring unit 41 and the ME/MC unit 43.

The noise measuring unit 41 calculates the standard deviation a of noises of the input screen and supplies the standard deviation to the addition ratio calculating unit 42. For example, as will be described below, the noise measuring unit 41 estimates a difference of an image obtained by compensating for a motion of an image (hereinafter referred to as an NR screen) where the noise reduction processing is executed with respect to an (n−1)-th frame and the input screen as the noises and calculates the standard deviation σ of the noises of the input screen.

The addition ratio calculating unit 42 calculates an addition ratio α according to the standard deviation σ of the noises. A coefficient α is supplied to the multiplier 45 and a coefficient (1−α) is supplied to the multiplier 44.

The buffer 47 stores data of the image (NR screen) where the noise reduction processing is executed with respect to the (n−1)-th frame.

The ME/MC unit 43 executes block matching processing using the input screen and the NR screen and predicts a motion of a screen. Thereby, a motion vector is calculated. In addition, the ME/MC unit 43 compensates for the motion of the NR screen on the basis of the motion vector and outputs the NR screen to the addition ratio calculating unit 42, the multiplier 45, and the noise measuring unit 41.

The multiplier 44 executes processing for multiplying each of the pixels xn of the input screen by the coefficient (1−α).

The multiplier 45 executes processing for multiplying each of the pixels xn-1 of the motion compensated NR screen by the coefficient α.

The adder 46 adds a pixel value output from the multiplier 44 and the multiplier 45 for each corresponding pixel and generates data of an image where the noise reduction processing is executed with respect to the n-th frame. The data of the image is output from the output terminal 32.

In this way, the time addition noise reduction processing by the IIR filter 20 is executed.

Meanwhile, the addition ratio α that is output from the addition ratio calculating unit 42 may be learned in advance. That is, an optimal addition ratio α according to a value of the standard deviation σ of the noises may be calculated by learning in advance and may be stored.

In this case, the learning is performed by preparing pairs of teacher images and student images corresponding to a plurality of kinds of noises and calculating the optimal addition ratio. For example, an image X to which noises of the standard deviational are added to a teacher image T is prepared, an NR image where the time addition noise reduction processing is executed with respect to the image X is obtained, and the NR image is used as a student image.

If pixels of the teacher image T are set to t, pixels of an image Xn of the n-th frame to which the noises have been added are set to xn, and pixels of the motion compensated NR image are set to xn−1, Expression 4 is realized ideally (when the addition ratio α is optimal).

$$t = (1-\alpha)x_n + \alpha \cdot x_{n-1} \quad (4)$$
$$= \alpha \cdot (x_{n-1} - x_n) + x_n$$

A plurality of samples of a linear expression that are obtained by extracting the corresponding pixels in the teacher image and the student image and substituting each pixel value in Expression 4 are generated. In this case, the pixels of the image to which the noises have been added and the pixels of the motion compensated NR screen are extracted as the pixels of the student image. The samples are added and a coefficient of the linear expression is calculated by a least-square method. That is, the optical addition ratio α is calculated by computation represented by Expression 5.

$$\alpha = \frac{\sum (x_{n-1} - x_n)(t - x_n)}{\sum (x_{n-1} - x_n)^2} \quad (5)$$

The addition ratio α that is calculated in Expression 5 becomes the optimal addition ratio when the time addition noise reduction processing is executed with respect to the image to which the noises of the standard deviation σ1 are added.

In the same way, an image X to which noises of the standard deviation σ2 are added to the teacher image T is prepared and an NR image where the time addition noise reduction processing is executed with respect to the image X is obtained. As described above, the optimal addition ratio when the time addition noise reduction processing is executed with respect to the image to which the noises of the standard deviation σ2 are added can be calculated as in Expressions 4 and 5.

In this way, an optimal addition ratio when the time addition noise reduction processing is executed with respect to an image to which noises of each of the standard deviational $\sigma 1$, the standard deviation $\sigma 2$, the standard deviation $\sigma 3$, . . . are added can be calculated.

However, it can be seen that the optimal addition ratio is not uniquely determined with respect to images of all frames and images of all portions. For example, when the motion prediction and the motion compensation between the (n−1)-th frame and the n-th frame are performed accurately, it is preferable that the addition ratio be increased and weighted to the pixels of the NR screen, to obtain a high-definition image. Meanwhile, when the motion prediction and the motion compensation between the (n−1)-th frame and the n-th frame are not performed accurately, it is preferable that the addition ratio be decreased and weighted to the pixels of the input screen, to obtain a high-definition image.

As such, when the optimal addition ratio is calculated, if an error (motion error) of the motion prediction and the motion compensation is not considered, the noises may not be appropriately reduced with respect to images of all frames and images of all portions.

Therefore, in the present technology, a differential feature amount is used as a parameter to consider the motion error.

The differential feature amount is calculated as follows.

Figure 3:
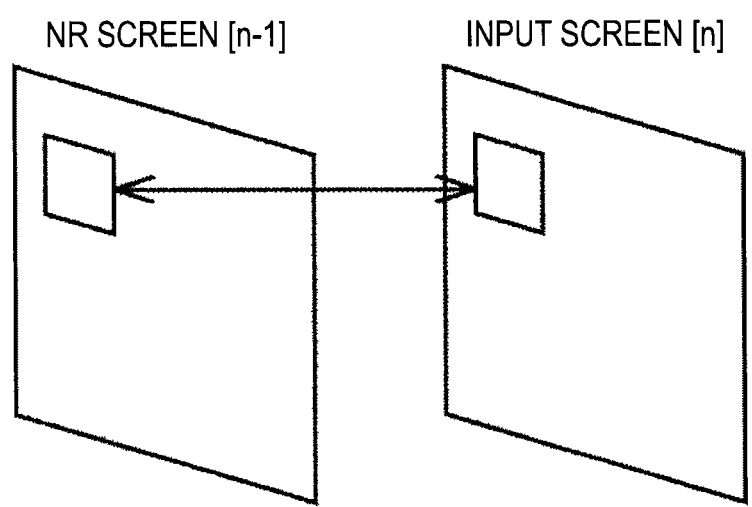
FIG. 3 is a diagram illustrating a differential feature amount.

For example, as illustrated in FIG. 3, a sum of absolute values of differences of blocks of 9×9 pixels that are configured by the corresponding pixels in the motion compensated NR screen and the input screen is calculated. The corresponding rectangular blocks in the NR screen and the input screen are shown by arrows in FIG. 3, respectively.

For example, if pixels of the n-th frame (input screen) are set to xn and pixels of the motion compensated NR image are set to xn−1, a differential feature amount d is calculated as in Expression 6.

$$d=|\overline{(X_n-X_{n-1})}| \quad (6)$$

That is, as represented by Expression 6, an absolute value of a differential mean value between the corresponding 81 (9×9) pixels in the block is calculated as the differential feature amount. In this way, the differential feature amount can be calculated for each block.

For example, a portion of an outline of a person is displayed in white and a value of the differential feature amount increases in a portion in which a motion error may easily occur.

Figure 4:
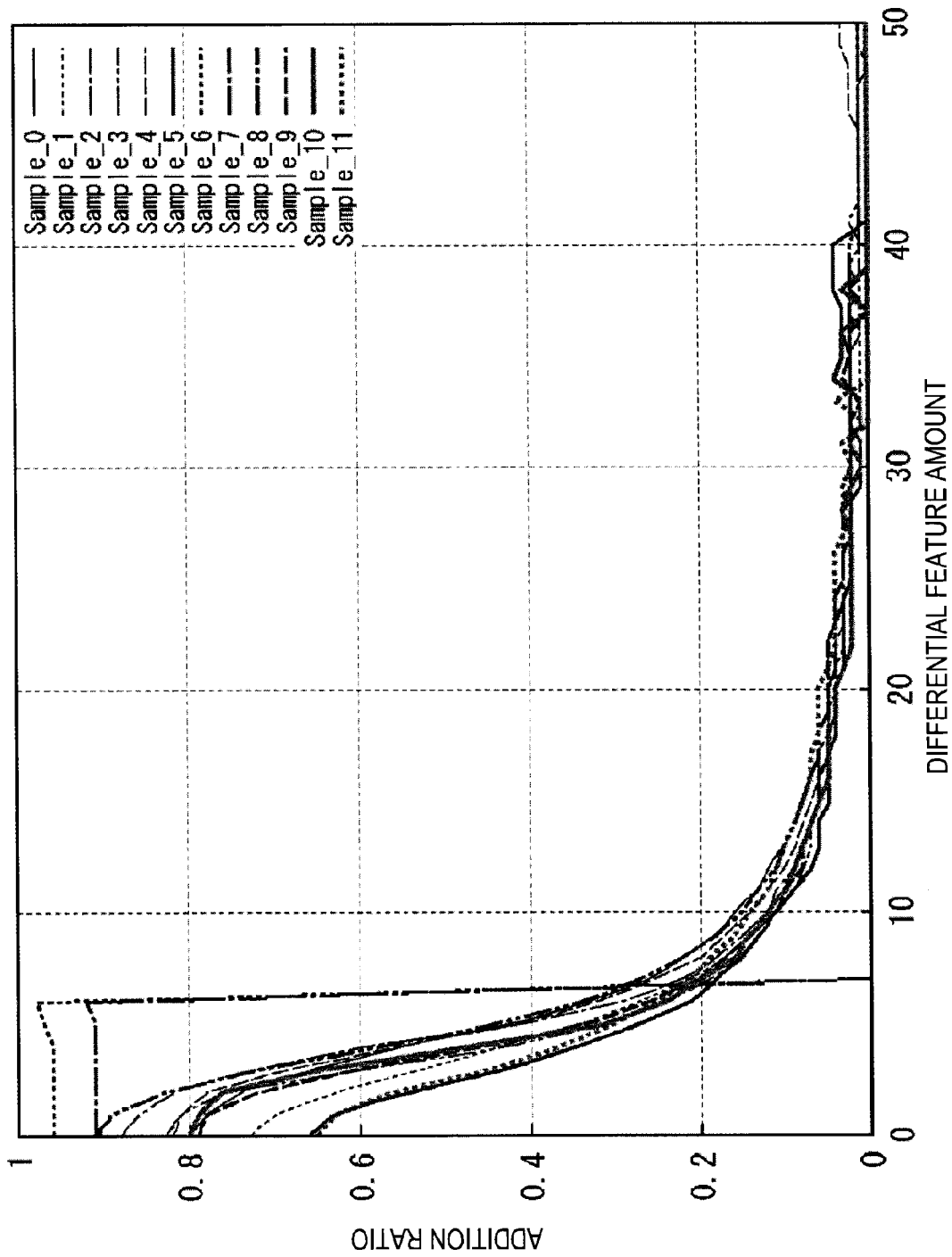
FIG. 4 is a graph illustrating a change of an addition ratio calculated using an image to which noises of σ=5 are added, according to a differential feature amount.

FIG. 4 is a graph illustrating a change of an optimal addition ratio calculated using an image where noises of the standard deviation of $\sigma=5$ are added to a teacher image, when the optimal addition ratio is calculated by learning as described above, according to a differential feature amount. In FIG. 4, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 4, the addition ratio according to the differential feature amount is shown by ten kinds of lines and each line corresponds to different content. That is, the graph illustrated in FIG. 4 illustrates the change of the optimal addition ratio calculated using the image where the noises of the standard deviation of $\sigma=5$ are added to the teacher image in the ten kinds of content, according to the differential feature amount.

As illustrated in FIG. 4, a downward-sloping pattern is shown in all of the lines and a rapid downward-sloping pattern is shown in a portion where a value of the differential feature amount is about 0 to 8. That is, in all of the content, when the value of the differential feature amount is small, a value of the addition ratio that is calculated by the learning increases and when the value of the differential feature amount is large, the value of the addition ratio that is calculated by the learning decreases.

That is, if the motion error is small, it is preferable that the addition ratio be increased and weighted to the pixels of the NR screen, to obtain a high-definition image. Meanwhile, when the motion error is large, it is preferable that the addition ratio be decreased and weighted to the pixels of the input screen, to obtain a high-definition image.

Figure 5:
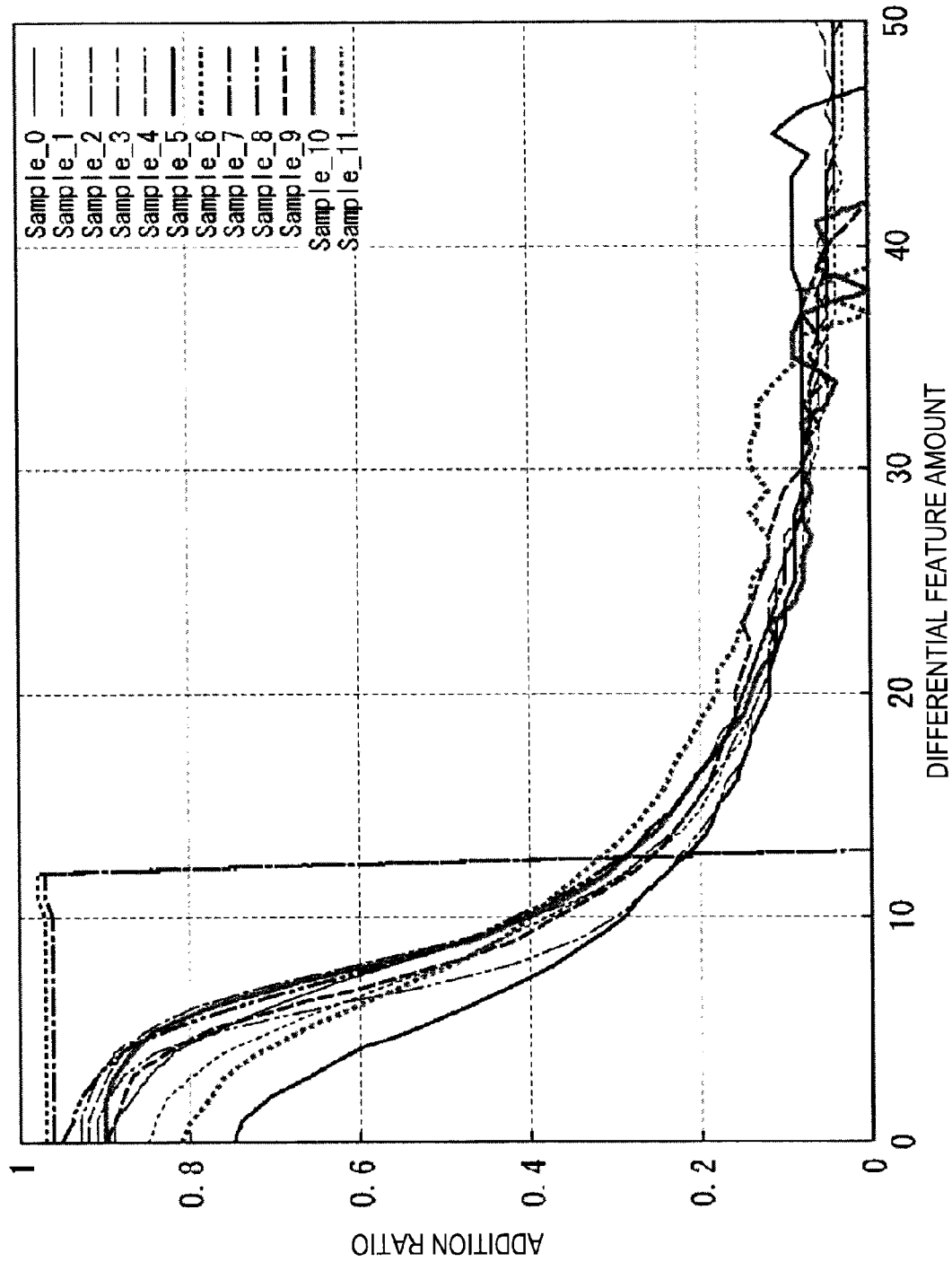
FIG. 5 is a graph illustrating a change of an addition ratio calculated using an image to which noises of σ=10 are added, according to a differential feature amount.

FIG. 5 is a graph illustrating a change of an optimal addition ratio calculated using an image where noises of the standard deviation of $\sigma=10$ are added to a teacher image, when the optimal addition ratio is calculated by learning, according to a differential feature amount. In FIG. 5, similar to FIG. 4, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 5, similar to FIG. 4, the addition ratio according to the differential feature amount is shown by ten kinds of lines and each line corresponds to a different content. That is, the graph illustrated in FIG. 5 illustrates the change of the optimal addition ratio calculated using the image where the noises of the standard deviation of $\sigma=10$ are added to the teacher image in the ten kinds of content, according to the differential feature amount.

As illustrated in FIG. 5, a downward-sloping pattern is shown in all of the lines and a rapid downward-sloping pattern is shown in a portion where a value of the differential feature amount is about 0 to 12. That is, similar to the case of FIG. 4, in all of the content, when the value of the differential feature amount is small, a value of the addition ratio that is calculated by the learning increases and when the value of the differential feature amount is large, the value of the addition ratio that is calculated by the learning decreases. However, unlike the case of FIG. 4, a range of the portion that shows the rapid downward-sloping pattern is slightly widened.

Figure 6:
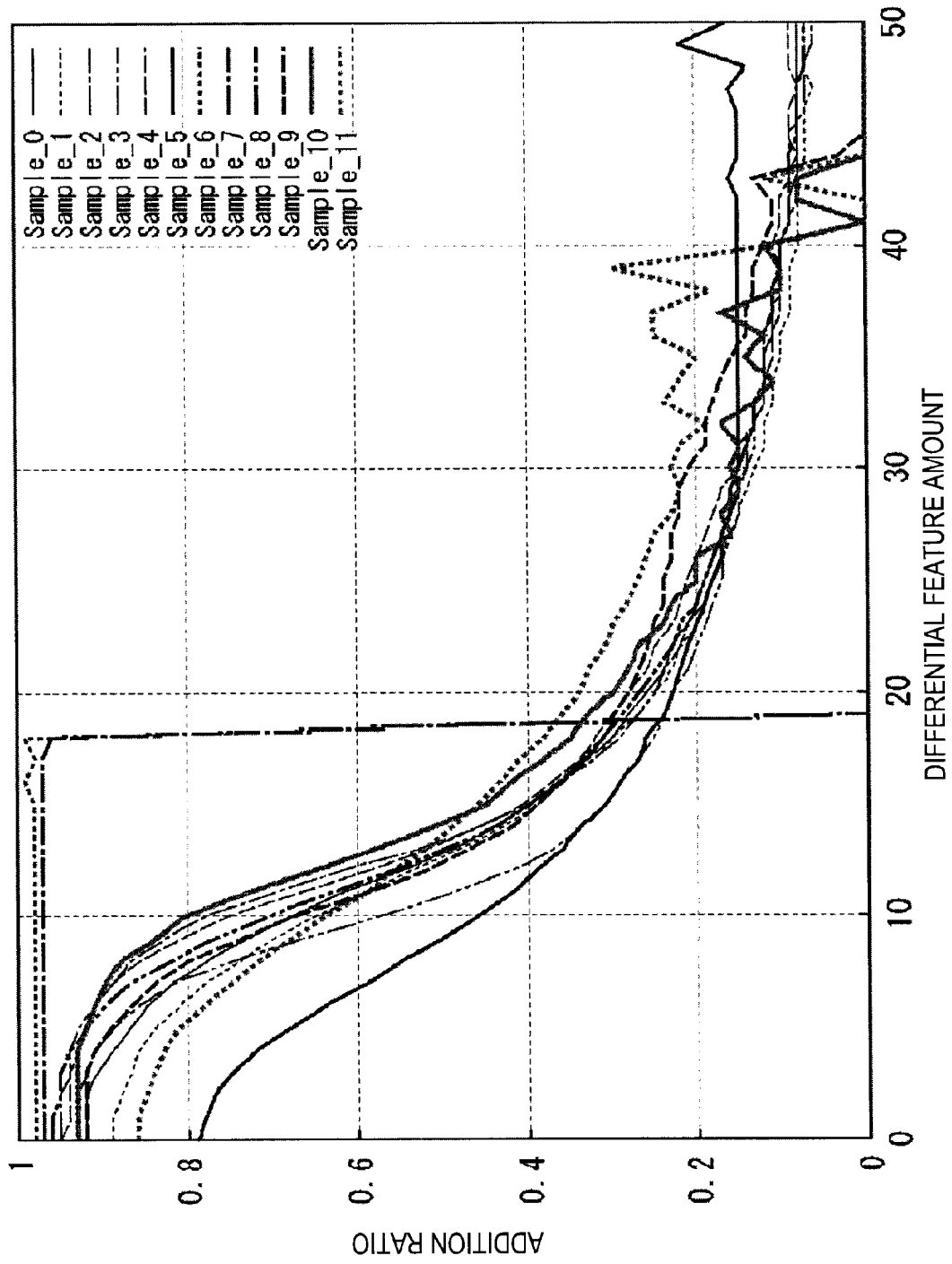
FIG. 6 is a graph illustrating a change of an addition ratio calculated using an image to which noises of σ=15 are added, according to a differential feature amount.

FIG. 6 is a graph illustrating a change of an optimal addition ratio calculated using an image where noises of the standard deviation of $\sigma=15$ are added to a teacher image, when the optimal addition ratio is calculated by learning, according to a differential feature amount. In FIG. 6, similar to FIG. 4, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 6, similar to FIG. 4, the addition ratio according to the differential feature amount is shown by ten kinds of lines and each line corresponds to different content. That is, the graph illustrated in FIG. 6 illustrates the change of the optimal addition ratio calculated using the image where the noises of the standard deviation of $\sigma=10$ are added to the teacher image in the ten kinds of contents, according to the differential feature amount.

As illustrated in FIG. 6, a downward-sloping pattern is shown in all of the lines and a rapid downward-sloping pattern is shown in a portion where a value of the differential feature amount is about 0 to 19. That is, similar to the cases of FIGS. 4 and 5, in all of the contents, when the value of the differential feature amount is small, a value of the addition ratio that is calculated by the learning increases and when the value of the differential feature amount is large, the value of the addition ratio that is calculated by the learning decreases. However, a range of the portion that shows the rapid downward-sloping pattern is wider than the range in the case of FIG. 5.

From the graphs illustrated in FIGS. 4 to 6, it can be seen that it is effective to include both the noise and the differential feature amount as the learning parameters when the optimal addition ratio is calculated by the learning.

However, when the optimal addition ratio is calculated by the learning, the noise and the differential feature amount are not necessarily sufficient as the learning parameters. This is because the optimal addition ratio becomes a different value according to a circulation history.

Figure 7:
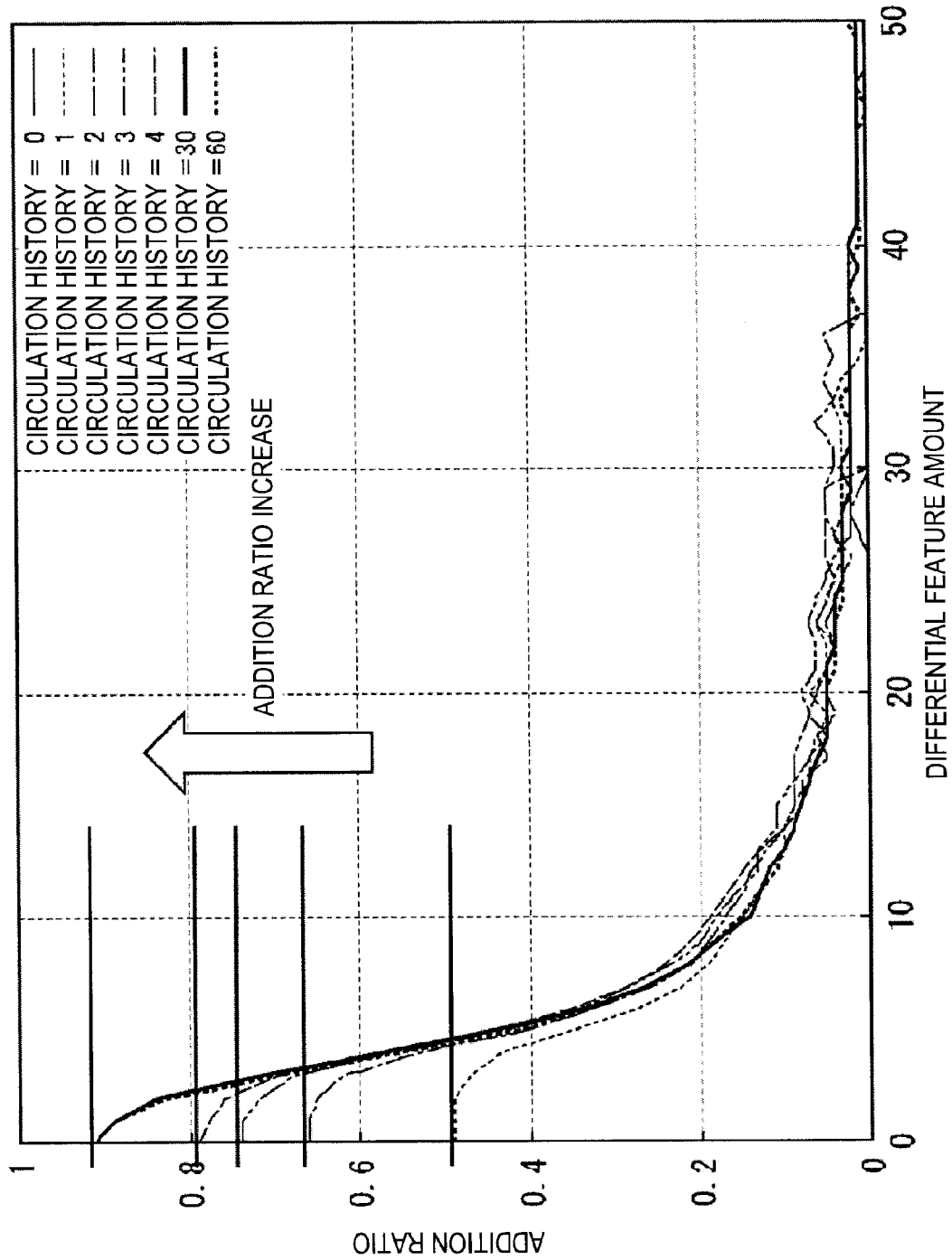
FIG. 7 is a graph illustrating a change of an addition ratio calculated in a different circulation history, according to a differential feature amount.

FIG. 7 is a graph illustrating a change of an optimal addition ratio calculated using an image where noises of the standard deviation of $\sigma=5$ are added to a teacher image, when the optimal addition ratio is calculated by learning, according to a differential feature amount. In FIG. 7, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 7, the addition ratio according to the differential feature amount is shown by seven kinds of lines, each line corresponds to a different circulation history, and the learning is performed using the same content. That is, the graph illustrated in FIG. 7 illustrates the change of the optimal addition ratio calculated using the image where the noises of the standard deviation of $\sigma=5$ are added to the teacher image in the seven kinds of different circulation histories, according to the differential feature amount.

In this case, the circulation history shows the number of times of additions of a temporal direction by which the NR screen stored in the buffer 47 of FIG. 2 is obtained. For example, when the time addition noise reduction processing is executed using a first frame of a motion picture as an input screen, the circulation history becomes 0 and when the time addition noise reduction processing is executed using a next frame as an input screen, the circulation history becomes 1.

As illustrated in FIG. 7, a downward-sloping pattern is shown in all of the lines and a rapid downward-sloping pattern is shown in a portion where a value of the differential feature amount is about 0 to 8. However, when the value of the differential feature amount is small, if a value of the circulation history increases, a value of the addition ratio increases (the addition ratio increases).

That is, as described above with reference to FIG. 1, if frames to be added increase, the noise of the NR screen is reduced. For this reason, it is preferable that the addition ratio be increased and weighted to the pixels of the NR screen, to obtain a high-definition image.

From the graphs illustrated in FIGS. 4 to 7, it can be seen that it is effective to include the noises, the differential feature amount, and the circulation history as the learning parameters when the optimal addition ratio is calculated by the learning.

Therefore, in the present technology, when the optimal addition ratio is calculated by the learning, the noises, the differential feature amount, and the circulation history are given as the learning parameters. That is, an addition ratio according to a combination of values of the noises, the differential feature amount, and the circulation history is calculated by the learning.

Figure 8:
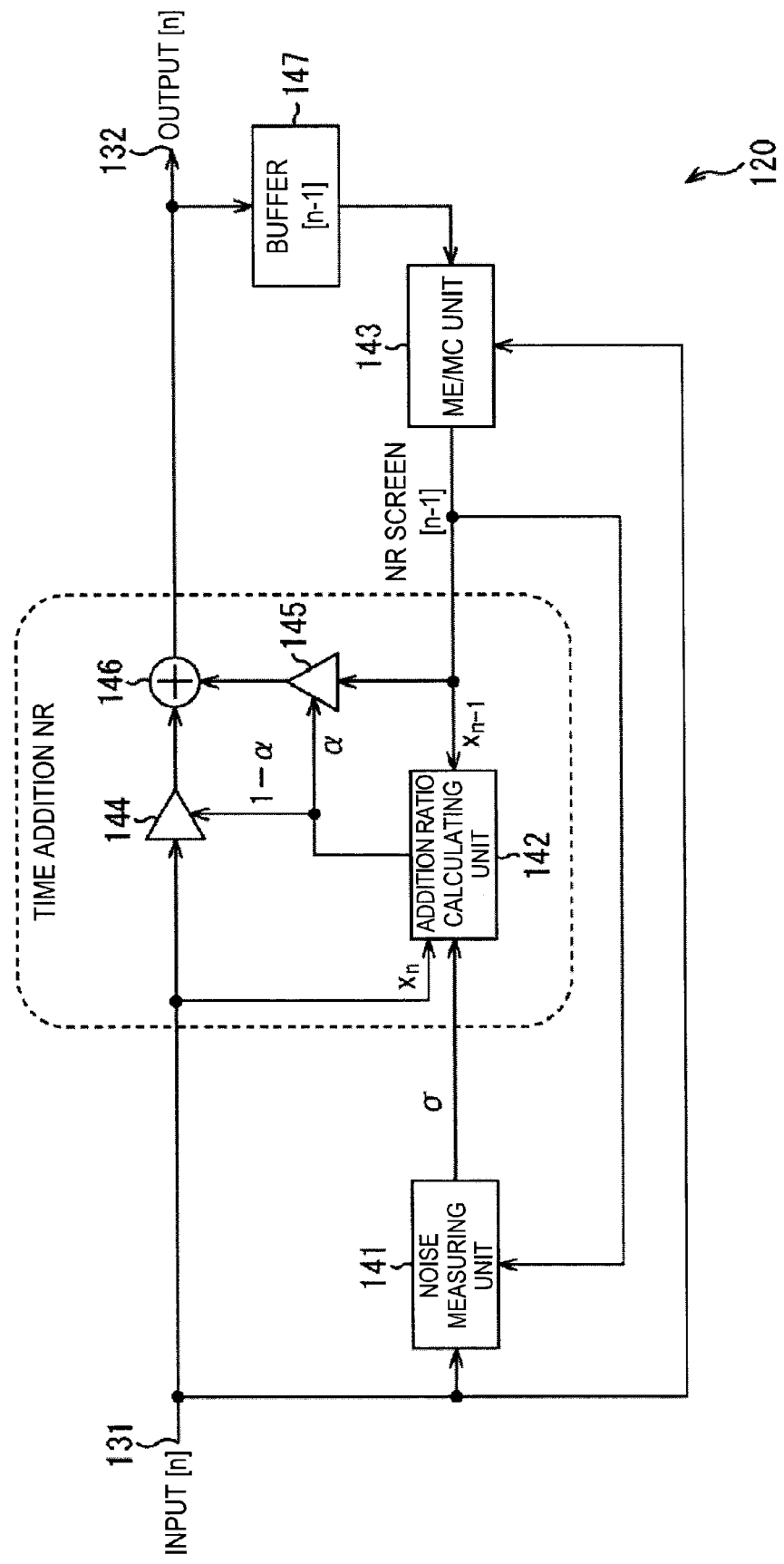
FIG. 8 is a block diagram illustrating a configuration example according to an embodiment of a noise reducing apparatus to which the present technology is applied.

FIG. 8 is a block diagram illustrating a configuration example according to an embodiment of a noise reducing apparatus to which the present technology is applied. A noise reducing apparatus 120 illustrated in FIG. 8 is configured as an IIR filter.

The noise reducing apparatus (IIR filter) 120 of FIG. 8 includes a noise measuring unit 141, an addition ratio calculating unit 142, a motion estimation (ME)/motion compensation (MC) unit 143, a multiplier 144, a multiplier 145, an adder 146, and a buffer 147.

An n-th frame (an input screen) input from an input terminal 131 is input to the noise measuring unit 141 and the ME/MC unit 143.

The noise measuring unit 141 calculates the standard deviation $\sigma$ of noises of the input screens and supplies the standard deviation to the addition ratio calculating unit 42. For example, as will be described below, the noise measuring unit 141 estimates a difference of an image obtained by compensating for a motion of an image (hereinafter referred to as an NR screen) where the noise reduction processing is executed with respect to an (n−1)-th frame and the input screens as the noises and calculates the standard deviation $\sigma$ of the noises of the input screen.

The addition ratio calculating unit 142 calculates an addition ratio $\alpha$ as described below. A coefficient $\alpha$ is supplied to the multiplier 145 and a coefficient $(1-\alpha)$ is supplied to the multiplier 144.

The buffer 147 stores data of the image (NR screen) where the noise reduction processing is executed with respect to the (n−1)-th frame.

The ME/MC unit 143 executes block matching processing using the input screen and the NR screen and predicts a motion of a screen. Thereby, a motion vector is calculated. The ME/MC unit 143 compensates for the motion of the NR screen on the basis of the motion vector, and outputs the NR screen to the addition ratio calculating unit 142, the multiplier 145, and the noise measuring unit 141.

The multiplier 144 executes processing for multiplying each of pixels xn of the input screen by the coefficient $(1-\alpha)$.

The multiplier 145 executes processing for multiplying each of pixels xn−1 of the motion compensated NR screen by the coefficient $\alpha$.

The adder 146 adds a pixel value output from the multiplier 144 and the multiplier 145 for each corresponding pixel and generates data of an image where the noise reduction processing is executed with respect to the n-th frame. The data of the image is output from an output terminal 132.

Figure 9:
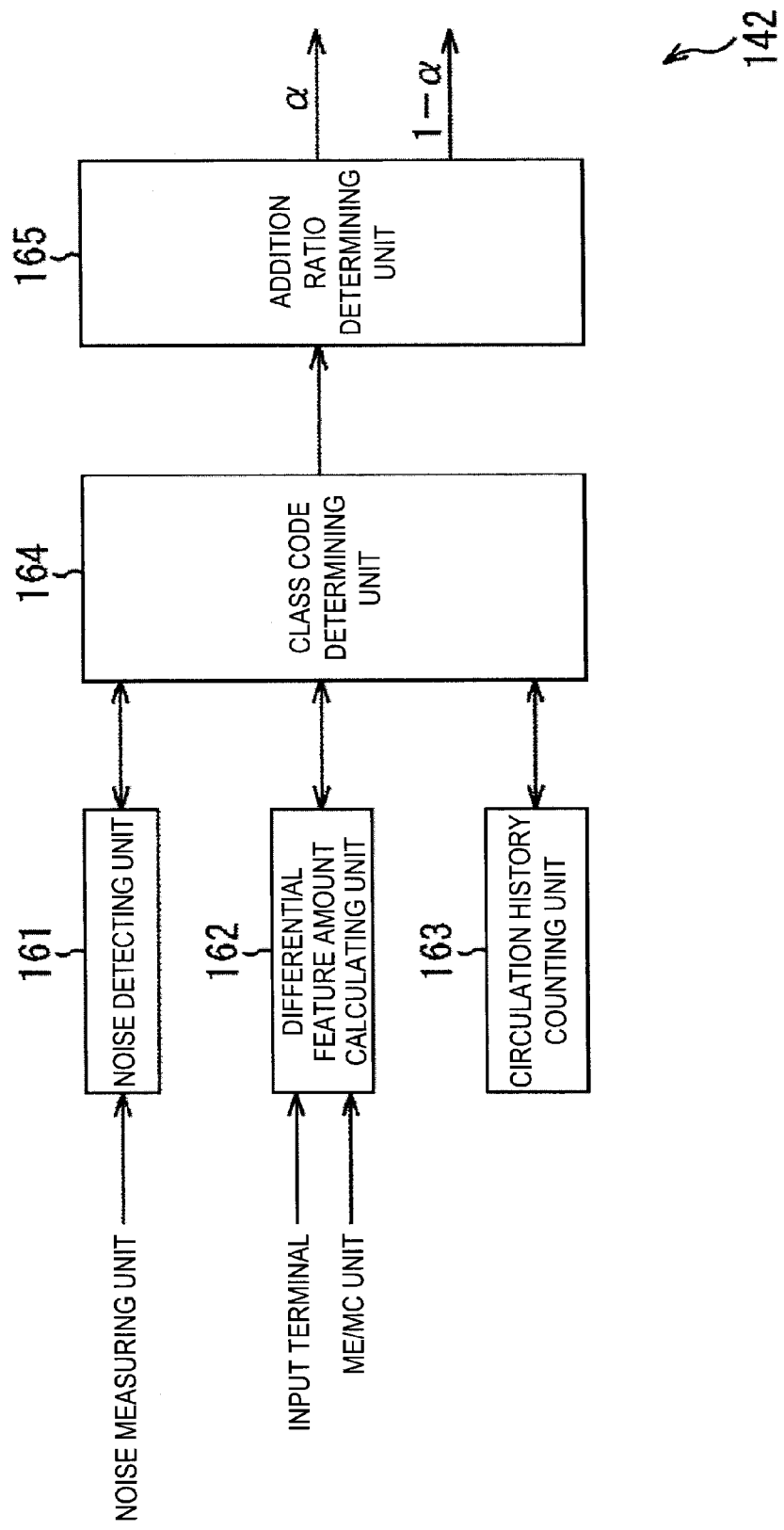
FIG. 9 is a block diagram illustrating a detailed configuration example of an addition ratio calculating unit of FIG. 8.

FIG. 9 is a block diagram illustrating a detailed configuration example of the addition ratio calculating unit 142 of FIG. 8. As illustrated in FIG. 9, the addition ratio calculating unit 142 has a noise detecting unit 161, a differential feature amount calculating unit 162, a circulation history counting unit 163, a class code determining unit 164, and an addition ratio determining unit 165.

The noise detecting unit 161 detects a value of the standard deviation $\sigma$ of noises supplied from the noise measuring unit 141 and supplies the value to the class code determining unit 164.

The differential feature amount calculating unit 162 calculates a differential feature amount of a pixel (attention pixel) to be processed on the basis of an input screen input from the input terminal 131 and a motion compensated NR screen output from the ME/MC unit 143. In addition, the differential feature amount calculating unit 162 supplies the calculated differential feature amount to the class code determining unit 164.

The circulation history counting unit 163 counts a circulation history in the time addition noise reduction processing and supplies the circulation history to the class code determining unit 164.

The class code determining unit 164 determines a class code on the basis of the value of the standard deviation a of the noises supplied from the noise detecting unit 161, a value of the differential feature amount supplied form the differential feature amount calculating unit 162, and a value of the circulation history supplied from the circulation history counting unit 163. The class code is determined for each pixel to be processed, according to a combination of the values of the noises, the differential feature amount, and the circulation history.

The addition ratio determining unit 165 determines an optimal addition ratio α on the basis of the class code supplied from the class code determining unit 164. The optimal addition ratio α is determined for each pixel to be processed.

The addition ratio determining unit 165 stores an addition ratio according to each class code that is an addition ratio calculated by learning in advance. Thereby, the addition ratio determining unit 165 selects an addition ratio corresponding to the combination of the value of the standard deviation a of the noises, the value of the differential feature amount, and the value of the circulation history with respect to the pixel to be processed and determines the optimal addition ratio α.

A coefficient value α is supplied from the addition ratio determining unit 165 to the multiplier 145 and a coefficient value (1−α) is supplied to the multiplier 144.

In this way, the time addition noise reduction processing by the IIR filter 120 is executed.

Figure 10:
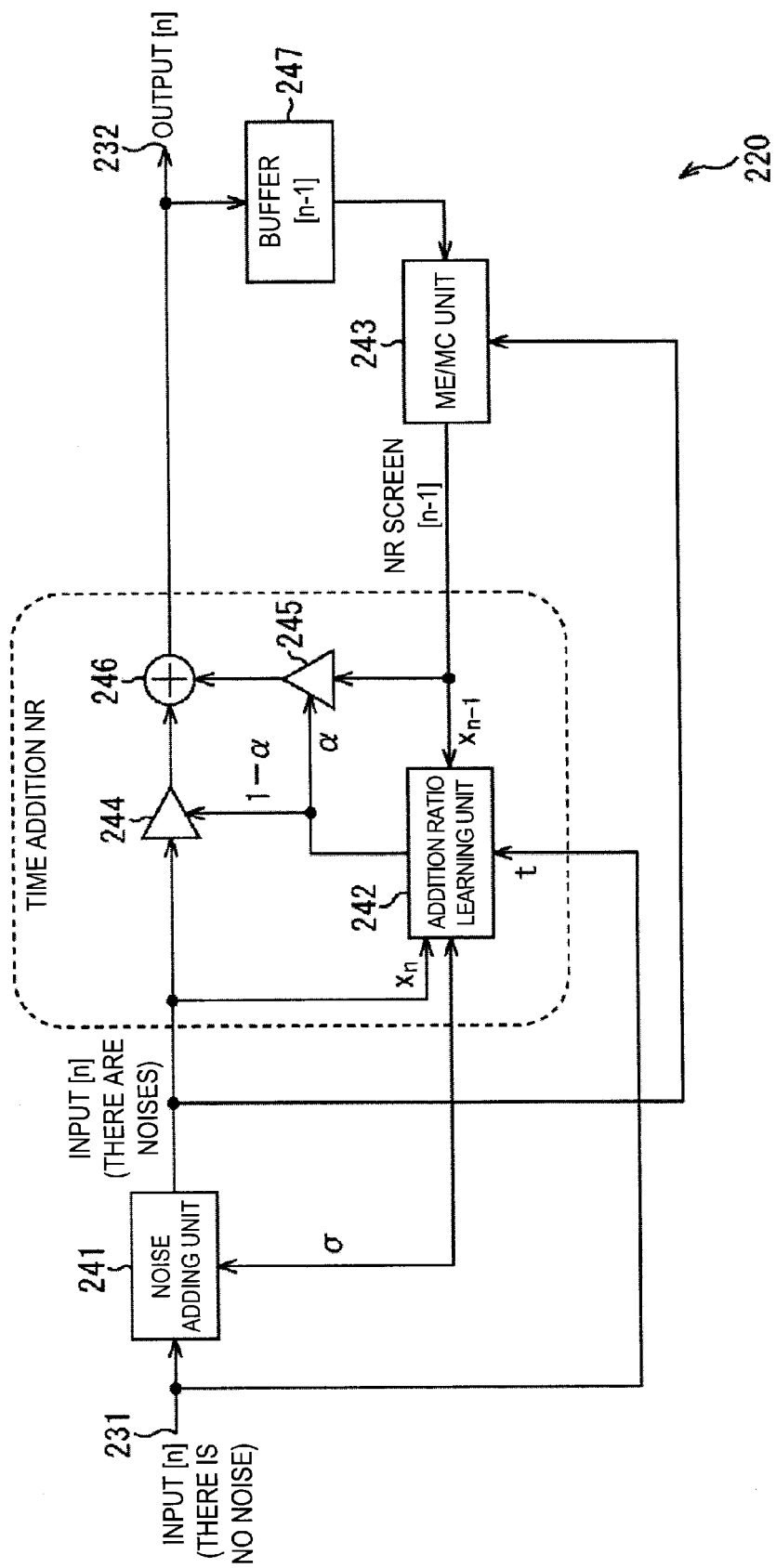
FIG. 10 is a block diagram illustrating a configuration example of an addition ratio learning apparatus corresponding to the noise reducing apparatus of FIG. 8.

FIG. 10 is a block diagram illustrating a configuration example of an addition ratio learning apparatus corresponding to the noise reducing apparatus of FIG. 8.

An addition ratio learning apparatus 220 of FIG. 10 includes a noise adding unit 241, an addition ratio learning unit 242, an ME/MC unit 243, a multiplier 244, a multiplier 245, and an adder 246.

In the case of the addition ratio learning apparatus 220, image data of a motion picture that functions as a teacher image is input from an input terminal 231. A frame that is input from the input terminal 231 is input to the noise adding unit 241 and the addition ratio learning unit 242.

The noise adding unit 241 adds predetermined noises to the input frame. The noise adding unit 241 adds noises of a plurality of noise amounts, according to setting from a user. For example, the noise adding unit 241 adds noises of the standard deviation α1, the standard deviation α2, the standard deviation α3, according to the setting from the user.

In addition, the noise adding unit 241 supplies a value of the standard deviation of the added noises to the addition ratio learning unit 242.

The n-th frame that is supplied from the noise adding unit 241 is input as an input screen to the addition ratio learning unit 242, the ME/MC unit 243, and the multiplier 244.

The addition ratio learning unit 242 learns an addition ratio α as will be described below. In addition, the addition ratio learning unit 242 supplies coefficients to the multiplier 244 and the multiplier 245 on the basis of the addition ratio obtained as the learning result. That is, the coefficient α is supplied to the multiplier 245 and the coefficient (1−α) is supplied to the multiplier 244.

The buffer 247 stores data of the image (NR screen) where the noise reduction processing is executed with respect to the (n−1)-th frame.

The ME/MC unit 243 executes block matching processing using the input screen and the NR screen and predicts a motion of a screen. Thereby, a motion vector is calculated. The ME/MC unit 243 compensates for the motion of the NR screen on the basis of the motion vector, and outputs the NR screen to the addition ratio learning unit 242 and the multiplier 245.

The multiplier 244 executes processing for multiplying each of pixels xn of the input screen with the coefficient (1−α).

The multiplier 245 executes processing for multiplying each of pixels xn−1 of the motion compensated NR screen by the coefficient α.

The adder 246 adds a pixel value output from the multiplier 244 and the multiplier 245 for each corresponding pixel and generates data of an image where the noise reduction processing is executed with respect to the n-th frame. The data of the image is output from an output terminal 232.

Figure 11:
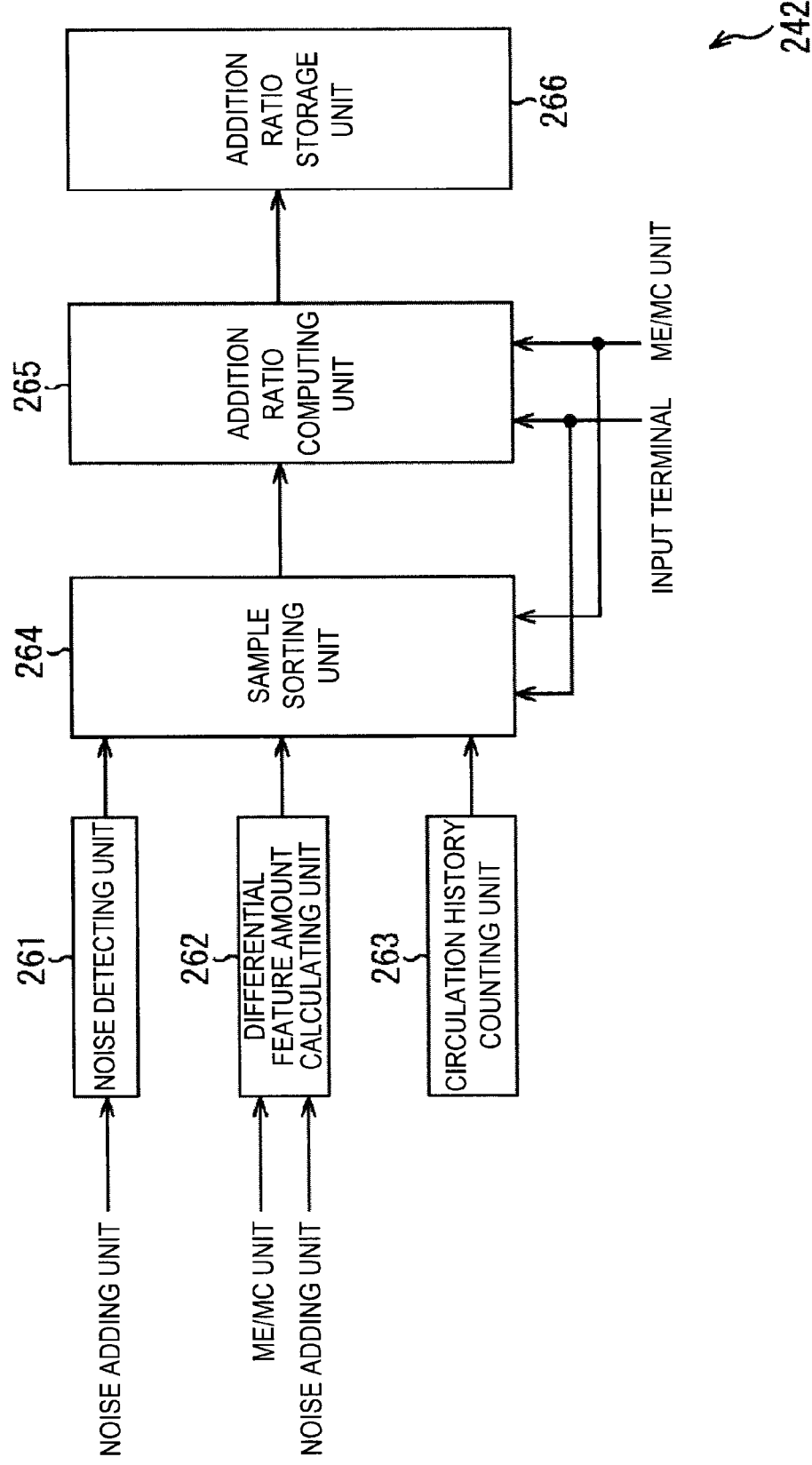
FIG. 11 is a block diagram illustrating a detailed configuration example of an addition ratio learning unit of FIG. 10.

FIG. 11 is a block diagram illustrating a detailed configuration example of the addition ratio learning unit 242 of FIG. 10. As illustrated in FIG. 11, the addition ratio learning unit 242 has a noise detecting unit 261, a differential feature amount calculating unit 262, a circulation history counting unit 263, a sample sorting unit 264, an addition ratio computing unit 265, and an addition ratio storage unit 266.

The noise detecting unit 261 detects a value of the standard deviation σ of noises supplied from the noise adding unit 241 and supplies the value to the sample sorting unit 264.

The differential feature amount calculating unit 262 calculates a differential feature amount of a pixel (attention pixel) to be processed on the basis of an input screen input from the noise adding unit 241 and a motion compensated NR screen output from the ME/MC unit 243. In addition, the differential feature amount calculating unit 262 supplies the calculated differential feature amount to the sample sorting unit 264.

The circulation history counting unit 263 counts a circulation history in the time addition noise reduction processing and supplies the circulation history to the sample sorting unit 264.

The sample sorting unit 264 determines a class code on the basis of the value of the standard deviation σ of the noises supplied from the noise detecting unit 261, a value of the differential feature amount supplied form the differential feature amount calculating unit 262, and a value of the circulation history supplied from the circulation history counting unit 263. The class code is determined for each pixel to be processed, according to a combination of the values of the noises, the differential feature amount, and the circulation history.

The sample sorting unit 264 extracts a combination of a pixel of a teacher image and a pixel of a student image, for each determined class code. That is, the sample sorting unit 264 extracts a value of the pixel of the teacher image supplied from the input terminal 231, a value of a pixel obtained by adding the noise to the pixel by the noise adding unit 241, and a value of the pixel of the motion compensated NR screen output from the ME/MC unit 243.

The addition ratio computing unit 265 generates the sample of the linear expression represented by Expression 4 on the basis of the pixel value supplied from the sample sorting unit 264, and adds the sample for each class code. In addition, the addition ratio computing unit 265 performs the computation of Expression 5 for each class code and calculates the addition ratio α. In this way, the value of the addition ratio α is updated whenever the sample is added.

After adding a sufficient amount of the samples, the computation of Expression 5 may be performed for each class code and the addition ratio α may be calculated.

The addition ratio storage unit 266 associates the addition ratio calculated by the addition ratio computing unit 265 with each class code and stores the addition ratio and the class code. Thereby, each addition ratio that corresponds to a combination of the value of the standard deviation σ of the noises, the value of the differential feature amount, and the value of the circulation history is obtained by the learning.

In this case, if the data stored in the addition ratio storage unit 266 is copied into the addition ratio determining unit 165 of FIG. 9, the time addition noise reduction processing can be executed by the noise reducing apparatus 120 of FIG. 8 while the optical addition ratio is applied according to the pixel to be processed, as described above.

In this way, the learning of the addition ratio by the addition ratio learning apparatus 220 is performed.

Figure 12:
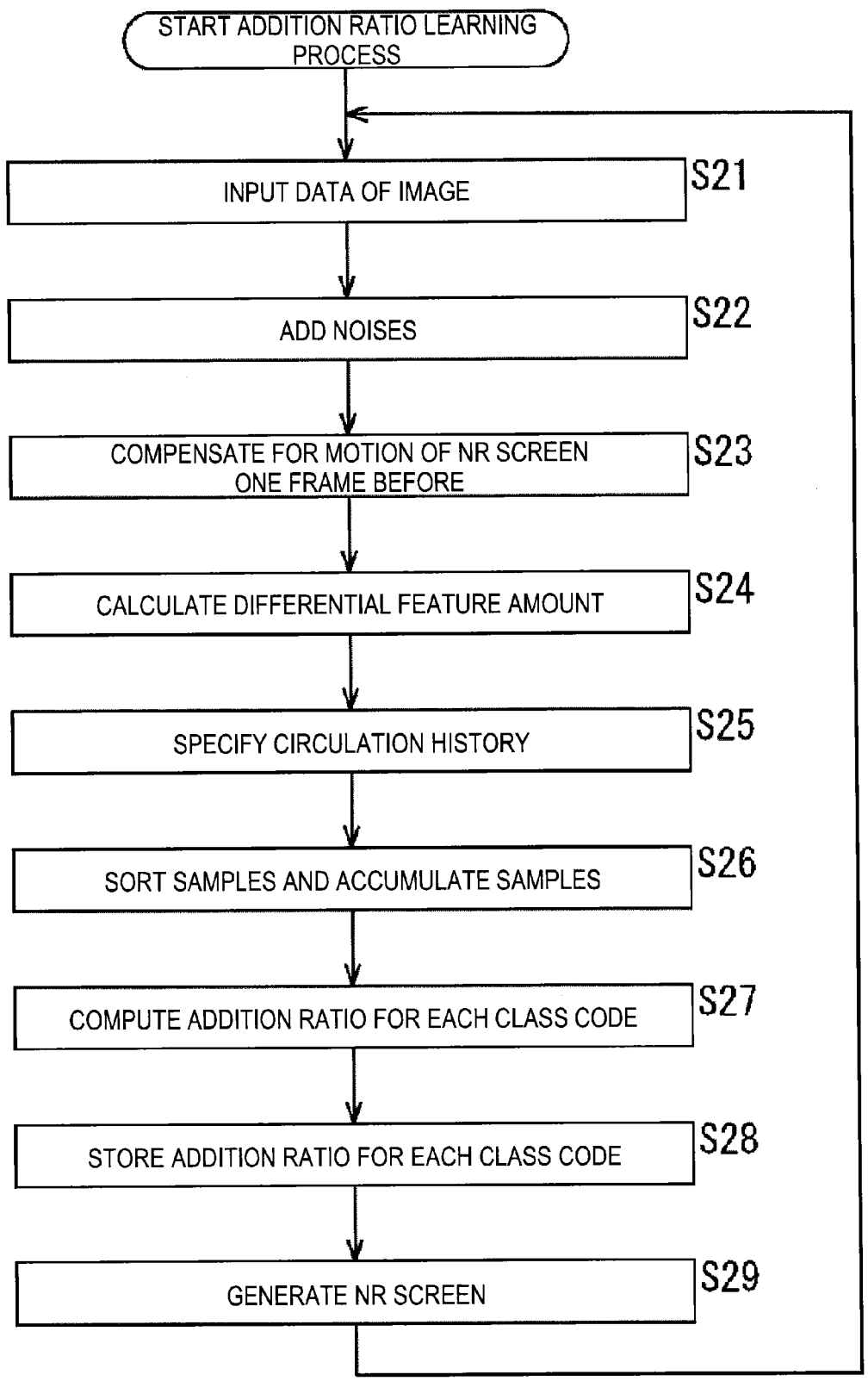
FIG. 12 is a flowchart illustrating an example of addition ratio learning processing.

Next, an example of the addition ratio processing by the addition ratio learning apparatus 220 of FIG. 10 will be described with reference to a flowchart of FIG. 12.

In step S21, the data of the image is input from the input terminal 231. In this case, data of a teacher image to which the noises are not added is input.

In step S22, the noise adding unit 241 adds the predetermined noises to the data (frame) of the image input in step S21. The noise adding unit 241 adds the plurality of noise amounts according to the setting from the user. For example, the noise adding unit 241 adds noises of the standard deviational σ1, the standard deviation σ2, the standard deviation σ3, . . . , according to the setting from the user.

The noise adding unit 241 supplies a value of the standard deviation of the added noises to the addition ratio learning unit 242 and the noise detecting unit 261 detects the value of the standard deviation σ of the noises supplied from the noise adding unit 241 and supplies the value of the standard deviation to the sample sorting unit 264.

In step S23, the ME/MC unit 243 compensates for a motion of the NR screen on the basis of the motion vector. At this time, by executing block matching processing using the input screen and the NR screen (data of an image where the noise reduction processing is executed with respect to the (n−1)-th frame, which is stored in the buffer 247), the motion of the screen is predicted, the motion vector is calculated, and the motion is compensated.

In step S24, the differential feature amount calculating unit 262 calculates the differential feature amount of the pixel to be processed on the basis of the input screen output from the noise adding unit 241 and the motion compensated NR screen output from the ME/MC unit 243. In addition, the differential feature amount calculating unit 262 supplies the calculated differential feature amount to the sample sorting unit 264.

In step S25, the circulation history counting unit 263 counts the circulation history in the time addition noise reduction processing, specifies the circulation history in the corresponding processing, and supplies the circulation history to the sample sorting unit 264.

In step S26, the sample sorting unit 264 determines a class code on the basis of the value of the standard deviation σ of the noises added in the process of step S22, a value of the differential feature amount calculated in the process of step S24, and a value of the circulation history specified in the process of step S25. The class code is determined for each pixel to be processed, according to a combination of the values of the noises, the differential feature amount, and the circulation history. At this time, the sample sorting unit 264 extracts a value of a pixel of a teacher image, a value of a pixel obtained by adding the noises to the pixel, and a value of a pixel of the motion compensated NR screen output from the ME/MC unit 243 as samples for each determined class code and accumulates the samples.

In step S27, the addition ratio computing unit 265 computes the addition ratio for each class code. At this time, the sample of the expression 4 is generated on the basis of the samples accumulated in the process of step S26 and the sample is added for each class code. The computation of the expression 5 is performed for each class code and the addition ratio α is calculated. After adding a sufficient amount of the samples, the computation of Expression 5 may be performed for each class code and the addition ratio α may be calculated.

In step S28, the addition ratio storage unit 266 associates the addition ratio computed in the process of step S27 with each class code and stores the addition ratio and the class code. Thereby, each addition ratio that corresponds to a combination of the value of the standard deviation σ of the noises, the value of the differential feature amount, and the value of the circulation history is obtained by the learning.

In step S29, the NR screen is generated. At this time, the multiplier 244 executes processing for multiplying pixels xn of the input screen by the coefficient (1−α) and the multiplier 245 executes processing for multiplying pixels xn−1 of the motion compensated NR screen by the coefficient α on the basis of the addition ratio α calculated in step S27. The adder 246 adds a pixel value output from the multiplier 244 and the multiplier 245 for each corresponding pixel and generates data (NR screen) of an image where the noise reduction processing is executed with respect to the n-th frame.

That is, weighted addition is performed on the pixel value of the input screen and the corresponding pixel value in the motion compensated NR screen and the time addition noise reduction processing is executed with respect to each pixel of the input screen. Thereby, the NR screen that is used when time addition noise reduction processing is executed to each pixel of the (n+1)-th frame is generated.

The generated NR screen is output from the output terminal 232 and is stored in the buffer 247.

Then, the process returns to step S21 and the following process is repetitively executed. That is, the above process is repetitively executed until the learning is completed.

In this way, the addition ratio learning processing is executed.

Figure 13:
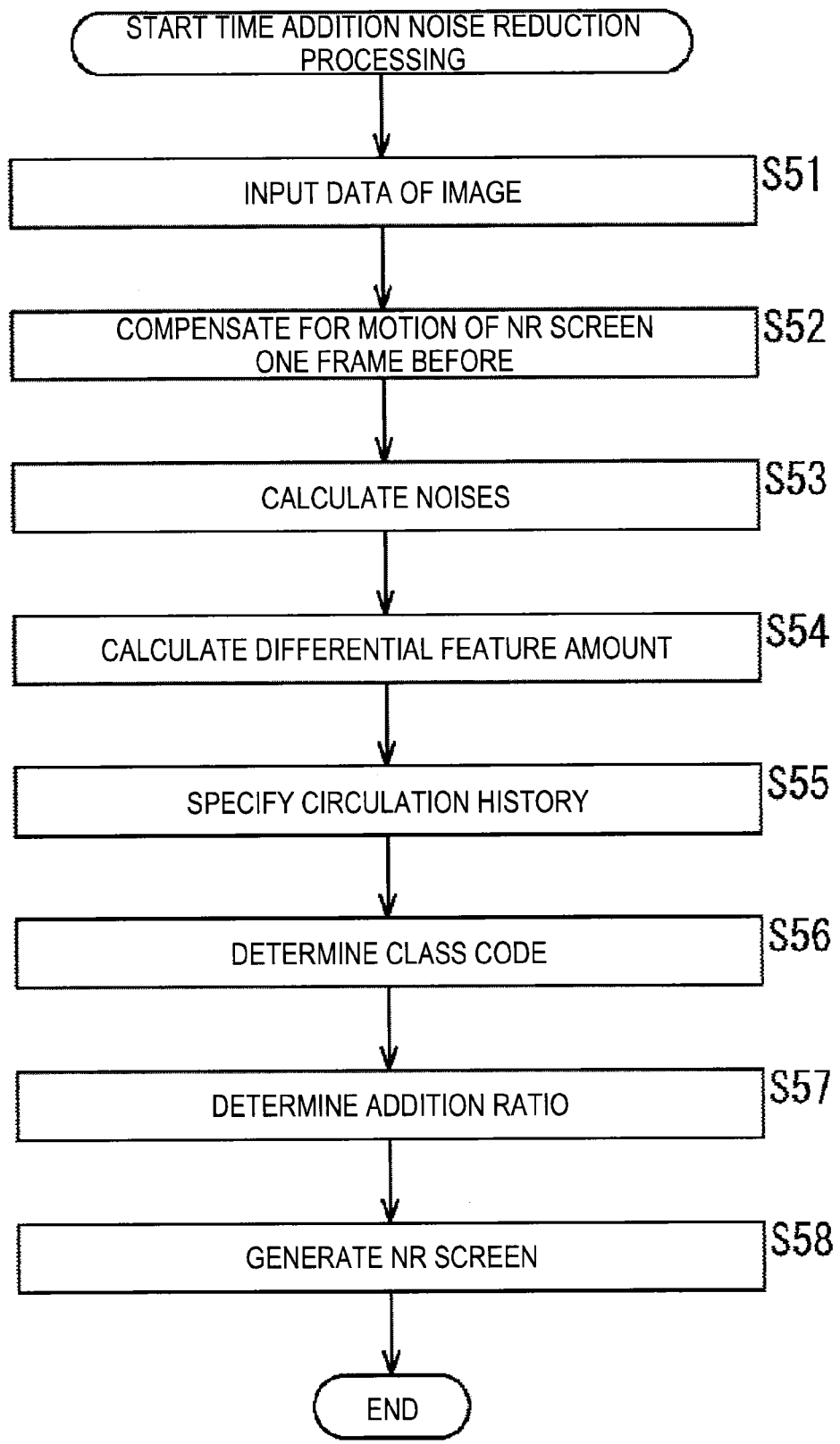
FIG. 13 is a flowchart illustrating an example of time addition noise reduction processing.

Next, an example of the time addition noise reduction processing by the noise reducing apparatus 120 of FIG. 8 will be described with reference to a flowchart of FIG. 13. In this case, the value of the addition ratio that is stored in the addition ratio storage unit 266 in the process of step S28 of FIG. 12 is copied into the addition ratio calculating unit 142 of the noise reducing apparatus 120.

In step S51, data of an image is input from the input terminal 131. In this case, the data of the image to reduce the noises is input.

In step S52, the ME/MC unit 143 compensates for the motion of the NR screen on the basis of the motion vector. At this time, by executing block matching processing using the input screen and the NR screen (data of an image where the noise reduction processing is executed with respect to the (n−1)-th frame, which is stored in the buffer 147), the motion of the screen is predicted, the motion vector is calculated, and the motion is compensated.

In step S53, the noise measuring unit 141 calculates the standard deviation σ of the noises of the input screen. At this time, the noise measuring unit 141 estimates a difference of an image obtained by compensating for the motion of the NR screen and the input screen as noises and calculates the standard deviation σ of the noises of the input screen.

The noise detecting unit 161 detects a value of the standard deviation σ of the noises supplied from the noise measuring unit 141 and supplies the value of the standard deviation to the class code determining unit 164.

In step S54, the differential feature amount calculating unit 162 calculates a differential feature amount of a pixel to be processed on the basis of the input screen input from the input terminal 131 and the motion compensated NR screen output from the ME/MC unit 143. In addition, the differential feature amount calculating unit 162 supplies the calculated differential feature amount to the class code determining unit 164.

In step S55, the circulation history counting unit 163 counts a circulation history in the time addition noise reduction processing, specifies the circulation history in the corresponding processing, and supplies the circulation history to the class code determining unit 164.

In step S56, the class code determining unit 164 determines a class code on the basis of the value of the standard deviation σ of the noises calculated in step S53, a value of the differential feature amount calculated in step S54, and a value of the circulation history specified in step S55. The class code is determined for each pixel to be processed, according to a combination of the values of the noises, the differential feature amount, and the circulation history.

In step S57, the addition ratio determining unit 165 determines the optimal addition ratio α on the basis of the class code determined in the process of step S56. The optimal addition ratio α is determined for each pixel to be processed.

At this time, the addition ratio determining unit 165 reads the addition ratio according to each class code that is the addition ratio calculated by the addition ratio learning processing of the addition ratio learning apparatus 220. Thereby, the addition ratio determining unit 165 selects an addition ratio corresponding to the combination of the value of the standard deviation σ of the noises, the value of the differential feature amount, and the value of the circulation history with respect to the pixel to be processed and determines the optimal addition ratio α.

A coefficient value α is supplied from the addition ratio determining unit 165 to the multiplier 145 and a coefficient value (1−α) is supplied to the multiplier 144.

In step S58, the NR screen is generated. That is, the multiplier 144 executes processing for multiplying pixels xn of the input screen by the coefficient (1−α) and the multiplier 145 executes processing for multiplying pixels xn−1 of the motion compensated NR screen by the coefficient α. The adder 146 adds pixel values output from the multiplier 144 and the multiplier 145 for each corresponding pixel and generates data of an image where the noise reduction processing is executed with respect to the n-th frame.

That is, weighted addition is performed on the pixel value of the input screen and the corresponding pixel value in the motion compensated NR screen, the time addition noise reduction processing is executed with respect to each pixel of the input screen, and an NR screen with respect to the n-th frame is generated.

The generated NR screen is output from the output terminal 132 and is stored in the buffer 147.

In this way, the time addition noise reduction processing is executed.

In the related art, only a single parameter is considered when the addition ratio is controlled. Therefore, in the related art, it is difficult to obtain a high noise reduction effect with respect to all images.

Meanwhile, in the present technology, when the optimal addition ratio is calculated by the learning, the noises, the differential feature amount, and the circulation history are given as the learning parameters. That is, the addition ratio according to the combination of the values of the noises, the differential feature amount, and the circulation history can be calculated by the learning. Therefore, according to the present technology, a high noise reduction effect can be obtained with respect to all images.

Figure 14:
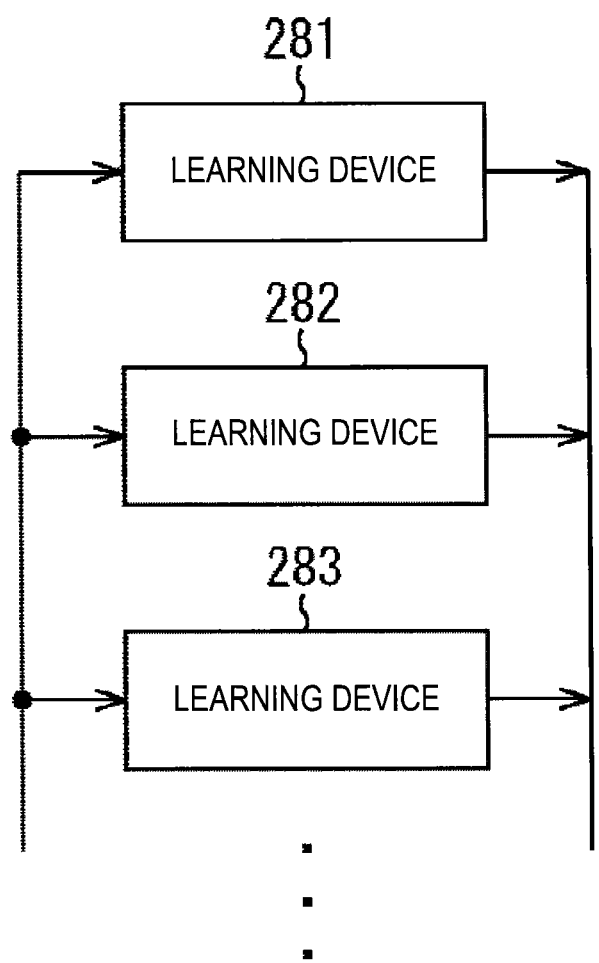
FIG. 14 is a block diagram illustrating another configuration example of the addition ratio learning unit of FIG. 10.

In the configuration of FIG. 10, the example of the case in which the addition ratios corresponding to all of the class codes are learned by the addition ratio learning unit 242 has been described. However, the addition ratio learning unit 242 may be configured as illustrated in FIG. 14. In an example of FIG. 14, the addition ratio learning unit 242 has a learning device 281, a learning device 282, a learning device 283, . . . that are provided inside. Each of the learning device 281, the learning device 282, the learning device 283, . . . of FIG. 14 has the same configuration as the configuration described above with reference to FIG. 11.

That is, in the case of the example of FIG. 14, parallel learning is performed in the addition ratio learning unit 242. For example, the addition ratio is learned such that the addition ratio α is learned by the learning device 281 when a value of the differential feature amount is equal to or more than 0 and less than 3, the addition ratio α is learned by the learning device 282 when the value of the differential feature amount is equal to or more than 3 and less than 6, the addition ratio α is learned by the learning device 283 when the value of the differential feature amount is equal to or more than 6 and less than 9, . . . . That is, the plurality of learning devices may share the addition ratios corresponding to the class codes on the basis of the values of the learning parameters, and may learn the addition ratios.

By this configuration, for example, a learning load of each learning device can be reduced. As a result, generalization performance of the time addition noise reduction processing can be improved.

Meanwhile, when the time addition noise reduction processing is executed, if a large motion error occurs, it is preferable to reset a count of the circulation history.

Figure 15:
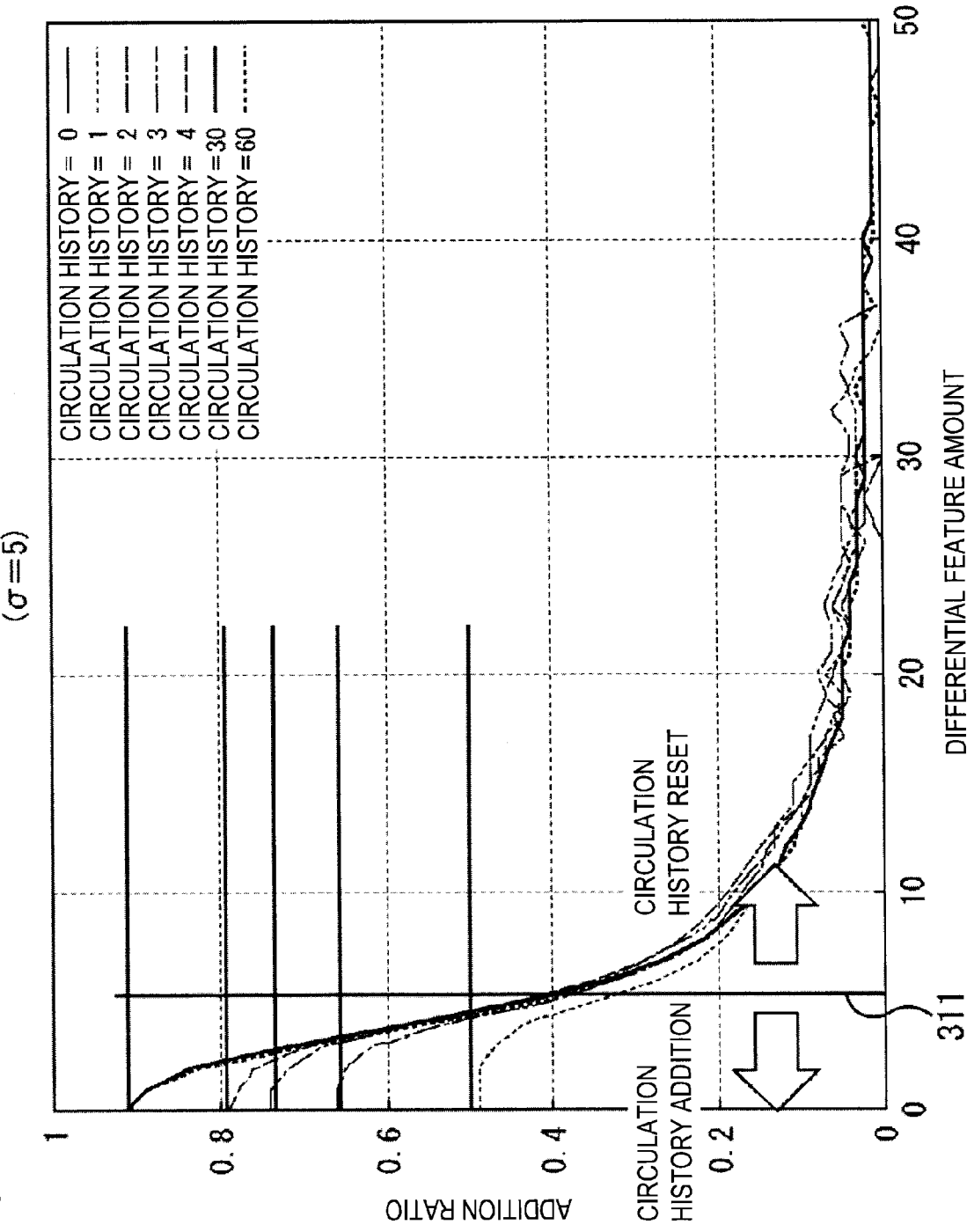
FIG. 15 is a graph illustrating a change of an addition ratio calculated in a different circulation history using an image to which noises of σ=5 are added, according to a differential feature amount.

FIG. 15 is a graph illustrating a change of an optimal addition ratio calculated using an image where noises of the standard deviation of σ=5 are added to a teacher image, when the optimal addition ratio is calculated by learning, according to a differential feature amount. In FIG. 15, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 15, the addition ratio according to the differential feature amount is shown by seven kinds of lines, each line corresponds to a different circulation history, and the learning is performed using the same content. That is, the graph illustrated in FIG. 15 illustrates the change of the optimal addition ratio calculated using the image where the noises of the standard deviation of σ=5 are added to the teacher image in the seven kinds of different circulation histories, according to the differential feature amount.

In this case, the circulation history shows the number of times of additions of a temporal direction by which the NR screen stored in the buffer 147 of FIG. 8 is obtained. For example, when the time addition noise reduction processing is executed using a first frame of a motion picture as an input screen, the circulation history becomes 0 and when the time addition noise reduction processing is executed using a next frame as an input screen, the circulation history becomes 1.

As illustrated in FIG. 15, a rapid downward-sloping pattern is shown in a portion where a value of the differential feature amount is about 0 to 5. However, when the value of the differential feature amount is small, if the value of the circulation history increases, the value of the addition ratio increases (addition ratio increases). In other words, in a right portion of a segment 311 of FIG. 15 (portion where the value of the differential feature amount is more than about 5), the value of the addition ratio almost constantly changes, regardless of the value of the circulation history. However, in a left portion of the segment 311, the value of the addition ratio becomes different according to the value of the circulation history.

From this, when the standard deviation σ is 5, for example, when the value of the differential feature amount more than 5 is detected, it is preferable to reset a count of the circulation history.

Figure 16:
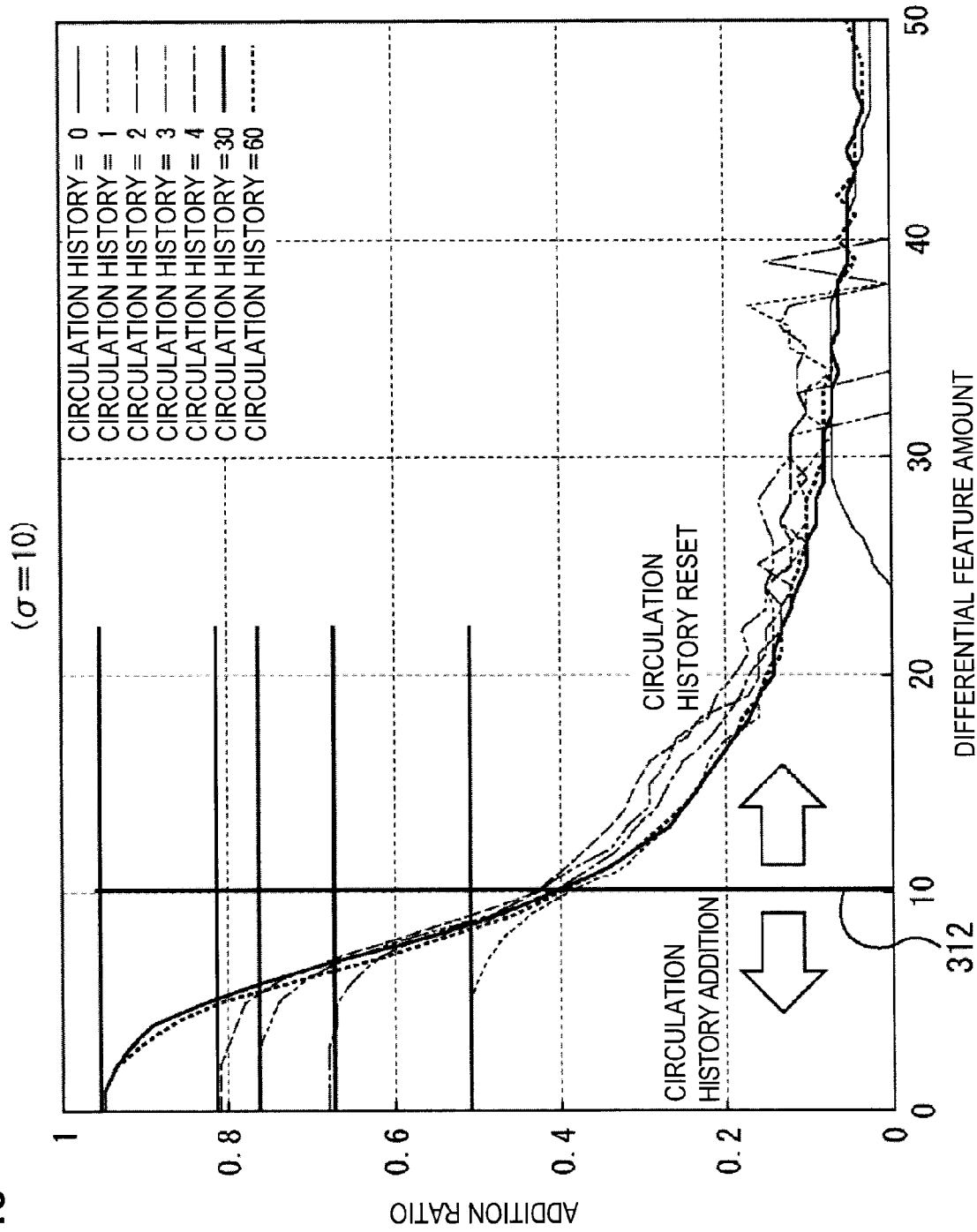
FIG. 16 is a graph illustrating a change of an addition ratio calculated in a different circulation history using an image to which noises of σ=10 are added, according to a differential feature amount.

FIG. 16 is a graph illustrating a change of an optimal addition ratio calculated using an image where noises of the standard deviation of σ=10 are added to a teacher image, when the optimal addition ratio is calculated by learning, according to a differential feature amount. In FIG. 16, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 16, the addition ratio according to the differential feature amount is shown by seven kinds of lines, each line corresponds to a different circulation history, and the learning is performed using the same content. That is, the graph illustrated in FIG. 16 illustrates the change of the optimal addition ratio calculated using the image where the noises of the standard deviation of σ=10 are added to the teacher image in the seven kinds of different circulation histories, according to the differential feature amount.

As illustrated in FIG. 16, a rapid downward-sloping pattern is shown in a portion where a value of the differential feature amount is about 0 to 10. However, when the value of the differential feature amount is small, if the value of the circulation history increases, the value of the addition ratio increases (addition ratio increases). In other words, in a right portion of a segment 312 of FIG. 16 (portion where the value of the differential feature amount is more than about 10), the value of the addition ratio almost constantly changes, regardless of the value of the circulation history. However, in a left portion of the segment 312, the value of the addition ratio becomes different according to the value of the circulation history.

From this, when the standard deviation σ is 10, for example, when the value of the differential feature amount more than 10 is detected, it is preferable to reset a count of the circulation history.

Figure 17:
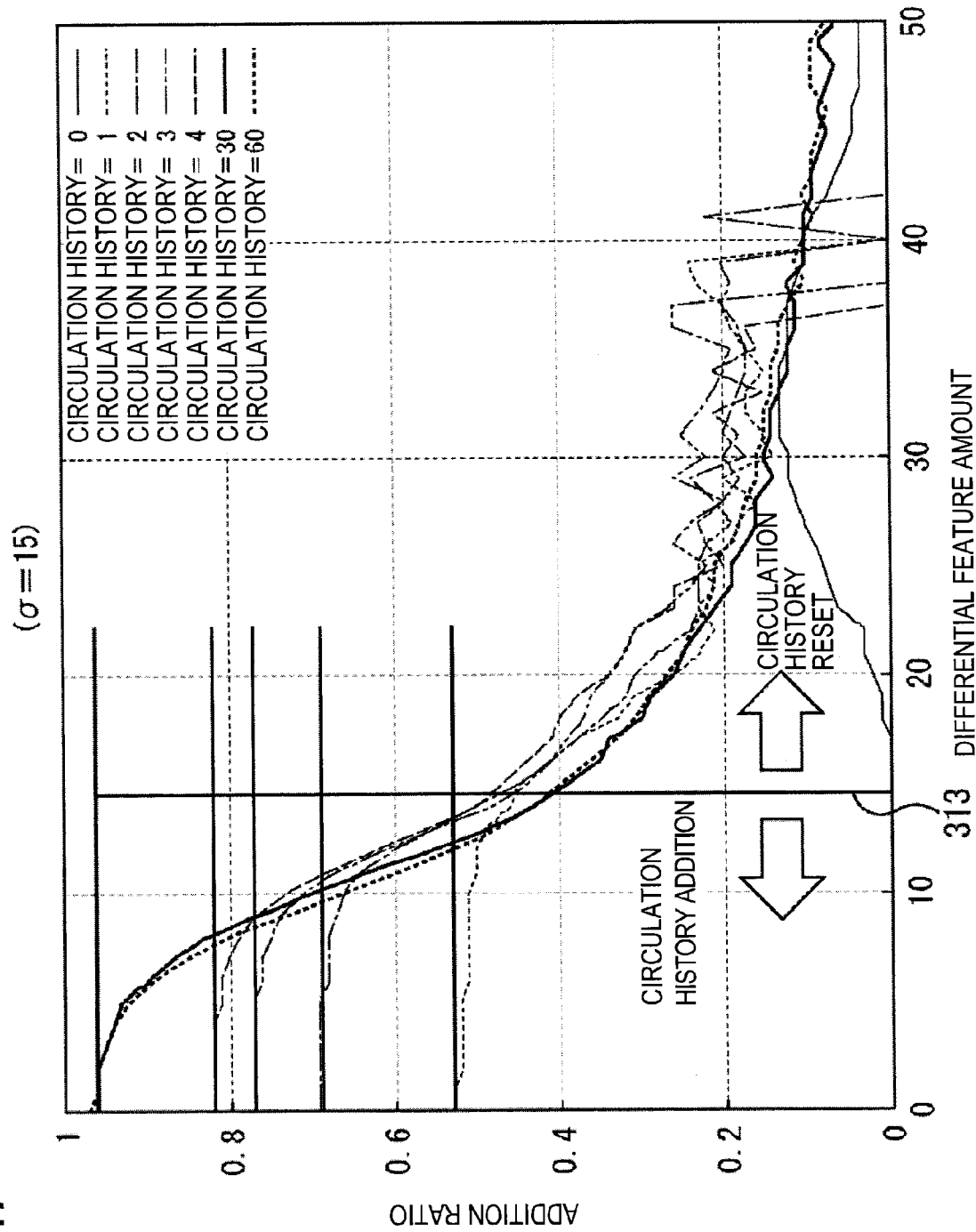
FIG. 17 is a graph illustrating a change of an addition ratio calculated in a different circulation history using an image to which noises of σ=15 are added, according to a differential feature amount.

FIG. 17 is a graph illustrating a change of an optimal addition ratio calculated using an image where noises of the standard deviation of σ=15 are added to a teacher image, when the optimal addition ratio is calculated by learning, according to a differential feature amount. In FIG. 17, a transverse axis shows a differential feature amount, a longitudinal axis shows an addition ratio, a student image is divided into a plurality of areas for each differential feature amount, an optimal addition ratio is calculated by learning to reduce noise of an image of each area, and the optimal addition ratio is graphed.

In FIG. 17, the addition ratio according to the differential feature amount is shown by seven kinds of lines, each line corresponds to a different circulation history, and the learning is performed using the same content. That is, the graph illustrated in FIG. 17 illustrates the change of the optimal addition ratio calculated using the image where the noises of the standard deviation of σ=15 are added to the teacher image in the seven kinds of different circulation histories, according to the differential feature amount.

As illustrated in FIG. 17, a rapid downward-sloping pattern is shown in a portion where a value of the differential feature amount is about 0 to 15. However, when the value of the differential feature amount is small, if the value of the circulation history increases, the value of the addition ratio increases (addition ratio increases). In other words, in a right portion of a segment 313 of FIG. 17 (portion where the value of the differential feature amount is more than about 15), the value of the addition ratio almost constantly changes, regardless of the value of the circulation history. However, in a left portion of the segment 313, the value of the addition ratio becomes different according to the value of the circulation history.

From this, when the standard deviation σ is 15, for example, when the value of the differential feature amount more than 15 is detected, it is preferable to reset a count of the circulation history.

The series of processes described above can be realized by hardware or software. When the series of processes is executed by the software, a program forming the software is installed in a computer embedded in dedicated hardware and a general-purpose personal computer 700 illustrated in FIG. 18 in which various programs can be installed and various functions can be executed, through a network or a recording medium.

Figure 18:
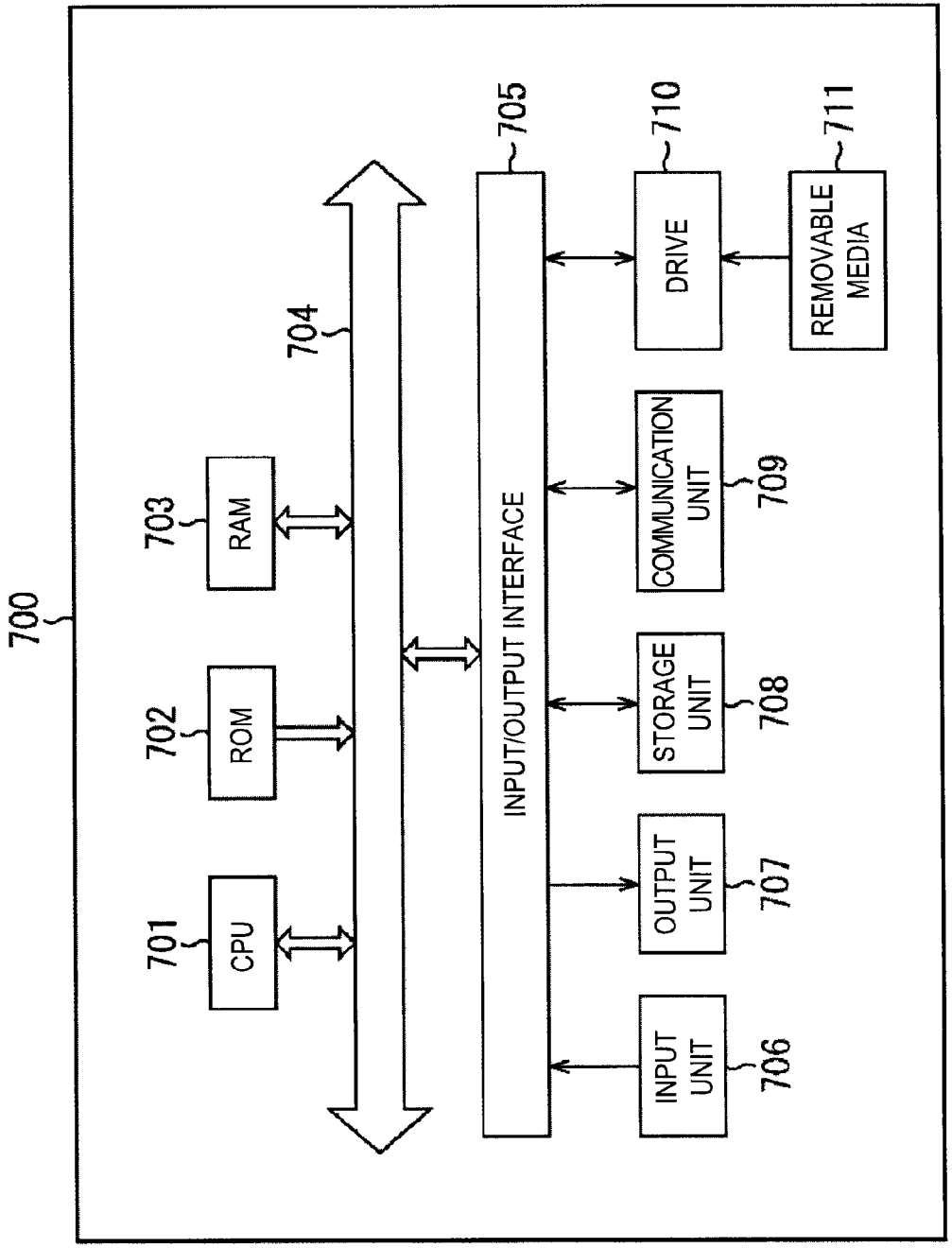
FIG. 18 is a block diagram illustrating a configuration example of a personal computer.

In FIG. 18, a central processing unit (CPU) 701 executes various processes according to a program stored in a read only memory (ROM) 702 or a program loaded from a storage unit 708 to a random access memory (RAM) 703. In the RAM 703, data that is necessary for executing the various processes by the CPU 701 is appropriately stored.

The CPU 701, the ROM 702, and the RAM 703 are connected mutually by a bus 704. Also, an input/output interface 705 is connected to the bus 704.

An input unit 706 that includes a keyboard and a mouse, an output unit 707 that includes a display composed of a liquid crystal display (LCD) and a speaker, a storage unit 708 that is configured using a hard disk, and a communication unit 709 that is configured using a modem and a network interface card such as a LAN card are connected to the input/output interface 705. The communication unit 709 executes communication processing through a network including the Internet.

A drive 710 is connected to the input/output interface 705 according to necessity, removable media 711 such as a magnetic disk, an optical disc, a magneto optical disc, or a semiconductor memory are appropriately mounted, and a computer program that is read from the removable media 711 is installed in the storage unit 708 according to necessity.

When the series of processes is executed by the software, a program forming the software is installed through the network such as the Internet or a recording medium composed of the removable media 711.

The recording medium may be configured using the removable media 711 illustrated in FIG. 18 that is composed of a magnetic disk (including a floppy disk (registered trademark)), an optical disc (including a compact disc-read only memory (CD-ROM) and a digital versatile disc (DVD)), a magneto optical disc (including a mini-disc (MD) (registered trademark)), or a semiconductor memory, which is distributed to provide a program to a user and has a recorded program, different from a device body, and may be configured using a hard disk that is included in the ROM 702 provided to the user in a state embedded in the device body in advance having a recorded program or the storage unit 708.

In the present disclosure, the series of processes includes a process that is executed in the order described, but the process is not necessarily executed temporally and can be executed in parallel or individually.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An addition ratio learning apparatus including:
- a noise adding unit that adds noises to data of an image input as a teacher image;
- a motion compensating unit that sets an image where time addition noise reduction processing is executed with respect to an image of an (n−1)-th frame to which the noises have been added as an NR screen and performs motion compensation with respect to the NR screen;
- a differential feature amount calculating unit that sets an image of an n-th frame to which the noises have been added as an input screen and calculates a differential feature amount on the basis of a pixel value of a predetermined area forming the input screen and a pixel value of a corresponding area in the motion compensated NR screen;
- a circulation history specifying unit that counts a circulation history in the time addition noise reduction processing and specifies the circulation history in the time addition noise reduction processing;
- an addition ratio computing unit that computes an addition ratio corresponding to the noises, the differential feature amount, and the circulation history on the basis of a pixel value of the teacher image, a corresponding pixel value in the input screen, and a corresponding pixel value in the motion compensated NR screen; and
- a time adding unit that performs multiplication by a coefficient determined according to the computed addition ratio to perform weighted addition on the pixel value of the input screen and the corresponding pixel value in the motion compensated NR screen and thereby executes the time addition noise reduction processing with respect to the input screen.

(2) The addition ratio learning apparatus according to (1), further including:
- a class code determining unit that sets the noises, the differential feature amount, and the circulation history as learning parameters and determines a class code obtained as a combination of the learning parameters,
- wherein the addition ratio computing unit computes an addition ratio corresponding to the class code.

(3) The addition ratio learning apparatus according to (2), further including:
- a storage unit that stores the addition ratio computed by the addition ratio computing unit as a learning result by the addition ratio learning apparatus, for each class code.

(4) The addition ratio learning apparatus according to (2) or (3), further including:
- a sample sorting unit that sorts samples of a linear expression generated using the pixel value of the teacher image, the corresponding pixel value in the input screen, and the corresponding pixel value in the motion compensated NR screen for each class code and accumulates the samples,
- wherein the addition ratio computing unit adds the samples, calculates a coefficient of the linear expression by a least-square method, and thereby computes the addition ratio.

(5) The addition ratio learning apparatus according to any of (2) to (4), further including:
- a plurality of addition ratio computing units,
- wherein the plurality of addition ratio computing units share the addition ratio and compute the addition ratio on the basis of a value of each learning parameter.

(6) An addition ratio learning method including:
- causing a noise adding unit to add noises to data of an image input as a teacher image;
- causing a motion compensating unit to set an image where time addition noise reduction processing is executed with respect to an image of an (n−1)-th frame to which the noises have been added as an NR screen and perform motion compensation with respect to the NR screen;
- causing a differential feature amount calculating unit to set an image of an n-th frame to which the noises have been added as an input screen and calculate a differential feature amount on the basis of a pixel value of a predetermined area forming the input screen and a pixel value of a corresponding area in the motion compensated NR screen;
- causing a circulation history specifying unit to count a circulation history in the time addition noise reduction processing and specify the circulation history in the time addition noise reduction processing;
- causing an addition ratio computing unit to compute an addition ratio corresponding to the noises, the differential feature amount, and the circulation history on the basis of a pixel value of the teacher image, a corresponding pixel value in the input screen, and a corresponding pixel value in the motion compensated NR screen; and
- causing a time adding unit to perform multiplication by a coefficient determined according to the computed addition ratio to perform weighted addition on the pixel value of the input screen and the corresponding pixel value in the motion compensated NR screen and thereby execute the time addition noise reduction processing with respect to the input screen.

(7) A program for causing a computer to function as an addition ratio learning apparatus,
- wherein the addition ratio learning apparatus includes:
- a noise adding unit that adds noises to data of an image input as a teacher image;
- a motion compensating unit that sets an image where time addition noise reduction processing is executed with respect to an image of an (n−1)-th frame to which the noises have been added as an NR screen and performs motion compensation with respect to the NR screen;
- a differential feature amount calculating unit that sets an image of an n-th frame to which the noises have been added as an input screen and calculates a differential feature amount on the basis of a pixel value of a predetermined area forming the input screen and a pixel value of a corresponding area in the motion compensated NR screen;
- a circulation history specifying unit that counts a circulation history in the time addition noise reduction processing and specifies the circulation history in the time addition noise reduction processing;
- an addition ratio computing unit that computes an addition ratio corresponding to the noises, the differential feature amount, and the circulation history on the basis of a pixel value of the teacher image, a corresponding pixel value in the input screen, and a corresponding pixel value in the motion compensated NR screen; and a time adding unit that performs multiplication by a coefficient determined according to the computed addition ratio to perform weighted addition on the pixel value of the input screen and the corresponding pixel value in the motion compensated NR screen and thereby executes the time addition noise reduction processing with respect to the input screen.

(8) A recording medium in which the program according to (7) is recorded.

(9) An image processing apparatus including:
a motion compensating unit that sets an image where time addition noise reduction processing is executed with respect to an image of an (n−1)-th frame as an NR screen and performs motion compensation with respect to the NR screen;
a noise measuring unit that sets an image of an n-th frame in data of an input image as an input screen and measures noises of the input screen;
a differential feature amount calculating unit that calculates a differential feature amount on the basis of a pixel value of a predetermined area forming the input screen and a pixel value of a corresponding area in the motion compensated NR screen;
a circulation history specifying unit that counts a circulation history in the time addition noise reduction processing and specifies the circulation history in the time addition noise reduction processing;
an addition ratio determining unit that determines an addition ratio corresponding to the noises, the differential feature amount, and the circulation history; and
a time adding unit that performs multiplication by a coefficient determined according to the determined addition ratio to perform weighted addition on the pixel value of the input screen and the corresponding pixel value in the motion compensated NR screen and thereby executes the time addition noise reduction processing with respect to the input screen.

(10) The image processing apparatus according to (9), further including:
a class code determining unit that determines a class code obtained as a combination of the noises, the differential feature amount, and the circulation history,
wherein the addition ratio determining unit determines an addition ratio corresponding to the class code.

(11) The image processing apparatus according to (9) or (10),
wherein the circulation history specifying unit resets a count of the circulation history when the differential feature amount more than a preset threshold value is calculated.

(12) The image processing apparatus according to any of (9) to (11),
wherein the circulation history specifying unit resets a count of the circulation history when the differential feature amount more than a threshold value determined in advance according to an amount of the noises is calculated.

(13) An image processing method including:
causing a motion compensating unit to set an image where time addition noise reduction processing is executed with respect to an image of an (n−1)-th frame as an NR screen and perform motion compensation with respect to the NR screen;
causing a noise measuring unit to set an image of an n-th frame in data of an input image as an input screen and measure noises of the input screen;
causing a differential feature amount calculating unit to calculate a differential feature amount on the basis of a pixel value of a predetermined area forming the input screen and a pixel value of a corresponding area in the motion compensated NR screen;
causing a circulation history specifying unit to count a circulation history in the time addition noise reduction processing and specify the circulation history in the time addition noise reduction processing;
causing an addition ratio determining unit to determine an addition ratio corresponding to the noises, the differential feature amount, and the circulation history; and
causing a time adding unit to perform multiplication by a coefficient determined according to the determined addition ratio to perform weighted addition on the pixel value of the input screen and the corresponding pixel value in the motion compensated NR screen and thereby execute the time addition noise reduction processing with respect to the input screen.

(14) A program for causing a computer to function as an image processing apparatus,
wherein the image processing apparatus includes:
a motion compensating unit that sets an image where time addition noise reduction processing is executed with respect to an image of an (n−1)-th frame as an NR screen and performs motion compensation with respect to the NR screen;
a noise measuring unit that sets an image of an n-th frame in data of an input image as an input screen and measures noises of the input screen;
a differential feature amount calculating unit that calculates a differential feature amount on the basis of a pixel value of a predetermined area forming the input screen and a pixel value of a corresponding area in the motion compensated NR screen;
a circulation history specifying unit that counts a circulation history in the time addition noise reduction processing and specifies the circulation history in the time addition noise reduction processing;
an addition ratio determining unit that determines an addition ratio corresponding to the noises, the differential feature amount, and the circulation history; and
a time adding unit that performs multiplication by a coefficient determined according to the determined addition ratio to perform weighted addition on the pixel value of the input screen and the corresponding pixel value in the motion compensated NR screen and thereby executes the time addition noise reduction processing with respect to the input screen.

(15) A recording medium in which a program according to (14) is recorded.

The present disclosure contains subject matter related to that disclosed in Japanese Priority Patent Application JP 2011-107306 filed in the Japan Patent Office on May 12, 2011, the entire content of which is hereby incorporated by reference.

What is claimed is:
1. An addition ratio learning apparatus, comprising:
circuitry configured to:
add noises to data of an image input as a teacher image;
set an image where time addition noise reduction processing is executed with respect to an image of an (n−1)-th frame to which the noises have been added as an NR screen and performs motion compensation with respect to the NR screen;
set an image of an n-th frame to which the noises have been added as an input screen and calculates a differential feature amount on the basis of a pixel value of a predetermined area forming the input screen and a pixel value of a corresponding area in the motion compensated NR screen;

count a circulation history in the time addition noise reduction processing and specifies the circulation history in the time addition noise reduction processing;

compute an addition ratio corresponding to the noises, the differential feature amount, and the circulation history on the basis of a pixel value of the teacher image, a corresponding pixel value in the input screen, and a corresponding pixel value in the motion compensated NR screen; and perform multiplication by a coefficient determined according to the computed addition ratio to perform weighted addition on the pixel value of the input screen and the corresponding pixel value in the motion compensated NR screen and thereby executes the time addition noise reduction processing with respect to the input screen.

2. The addition ratio learning apparatus according to claim 1, wherein the circuitry is further configured to:

set the noises, the differential feature amount, and the circulation history as learning parameters and determines a class code obtained as a combination of the learning parameters, and compute an addition ratio corresponding to the class code.

3. The addition ratio learning apparatus according to claim 1, wherein the circuitry is further configured to:

set the noises, the differential feature amount, and the circulation history as learning parameters and determines a class code obtained as a combination of the learning parameters, store the addition ratio as a learning result by the addition ratio learning apparatus, for each class code.

4. The addition ratio learning apparatus according to claim 1, wherein the circuitry is further configured to:

set the noises, the differential feature amount, and the circulation history as learning parameters and determines a class code obtained as a combination of the learning parameters, sort samples of a linear expression generated using the pixel value of the teacher image, the corresponding pixel value in the input screen, and the corresponding pixel value in the motion compensated NR screen for each class code and accumulates the samples, add the samples, calculates a coefficient of the linear expression by a least-square method, and thereby computes the addition ratio.

5. The addition ratio learning apparatus according to claim 1, further comprising:

a plurality of addition ratio computing units, wherein the plurality of addition ratio computing units share the addition ratio and compute the addition ratio on the basis of a value of each learning parameter.

6. An addition ratio learning method comprising:

adding, by processing circuitry, noises to data of an image input as a teacher image;

setting, by the processing circuitry, an image where time addition noise reduction processing is executed with respect to an image of an (n−1)-th frame to which the noises have been added as an NR screen and perform motion compensation with respect to the NR screen;

setting, by the processing circuitry, an image of an n-th frame to which the noises have been added as an input screen and calculate a differential feature amount on the basis of a pixel value of a predetermined area forming the input screen and a pixel value of a corresponding area in the motion compensated NR screen;

counting, by the processing circuitry, a circulation history in the time addition noise reduction processing and specify the circulation history in the time addition noise reduction processing;

computing, by the processing circuitry, an addition ratio corresponding to the noises, the differential feature amount, and the circulation history on the basis of a pixel value of the teacher image, a corresponding pixel value in the input screen, and a corresponding pixel value in the motion compensated NR screen; and performing, by the processing circuitry, multiplication by a coefficient determined according to the computed addition ratio to perform weighted addition on the pixel value of the input screen and the corresponding pixel value in the motion compensated NR screen and thereby execute the time addition noise reduction processing with respect to the input screen.

7. A non-transitory computer-readable storage medium having computer readable program codes embodied in the computer readable storage medium that, when executed cause a computer to function as an addition ratio learning apparatus and to execute:

adding noises to data of an image input as a teacher image;

a motion compensating unit that sets an image where time addition noise reduction processing is executed with respect to an image of an (n−1)-th frame to which the noises have been added as an NR screen and performs motion compensation with respect to the NR screen;

setting an image of an n-th frame to which the noises have been added as an input screen and calculates a differential feature amount on the basis of a pixel value of a predetermined area forming the input screen and a pixel value of a corresponding area in the motion compensated NR screen;

counting a circulation history in the time addition noise reduction processing and specifies the circulation history in the time addition noise reduction processing;

computing an addition ratio corresponding to the noises, the differential feature amount, and the circulation history on the basis of a pixel value of the teacher image, a corresponding pixel value in the input screen, and a corresponding pixel value in the motion compensated NR screen; and performing multiplication by a coefficient determined according to the computed addition ratio to perform weighted addition on the pixel value of the input screen and the corresponding pixel value in the motion compensated NR screen and thereby executes the time addition noise reduction processing with respect to the input screen.

* * * * *